United States Patent [19]

Froyd et al.

[11] 4,109,185
[45] Aug. 22, 1978

[54] SERVO SYSTEM EMPLOYING DIGITAL COMPONENTS

[75] Inventors: Stanley G. Froyd, San Marino; Raymond C. Ue, Monterey Park; John Paul Buchanan, Monrovia, all of Calif.

[73] Assignee: McDonnell Douglas Corporation, Long Beach, Calif.

[21] Appl. No.: 754,909

[22] Filed: Dec. 27, 1976

[51] Int. Cl.² .............................................. G05B 19/24
[52] U.S. Cl. .................................. 318/571; 318/603; 318/608; 318/661
[58] Field of Search ................ 318/661, 603, 608, 571

[56] References Cited

U.S. PATENT DOCUMENTS

| | | | |
|---|---|---|---|
| 3,519,904 | 7/1970 | Rogers | 318/603 X |
| 3,906,324 | 9/1975 | Smith | 318/604 X |
| 4,021,714 | 5/1977 | Jones et al. | 318/661 X |
| 4,023,085 | 5/1977 | Bishop et al. | 318/661 X |

*Primary Examiner*—B. Dobeck
*Attorney, Agent, or Firm*—Walter J. Jason; Donald L. Royer

[57] ABSTRACT

A servo system, particularly well suited for use in a computerized numerical control system for a large machine tool, in which a plurality of axis controlling servo circuits are controlled by one computerized axis controller. As each controlled axis moves, an attached resolver's output is digitized to generate a digital position feedback signal which is compared to the desired position in the computer. The resultant error signal is converted to an analog voltage to control said axis motion. A digital clock and counter drives two digital to analog converters to create the two resolver inputs, and supplies timing signals to the computer, thus synchronizing the system.

20 Claims, 22 Drawing Figures

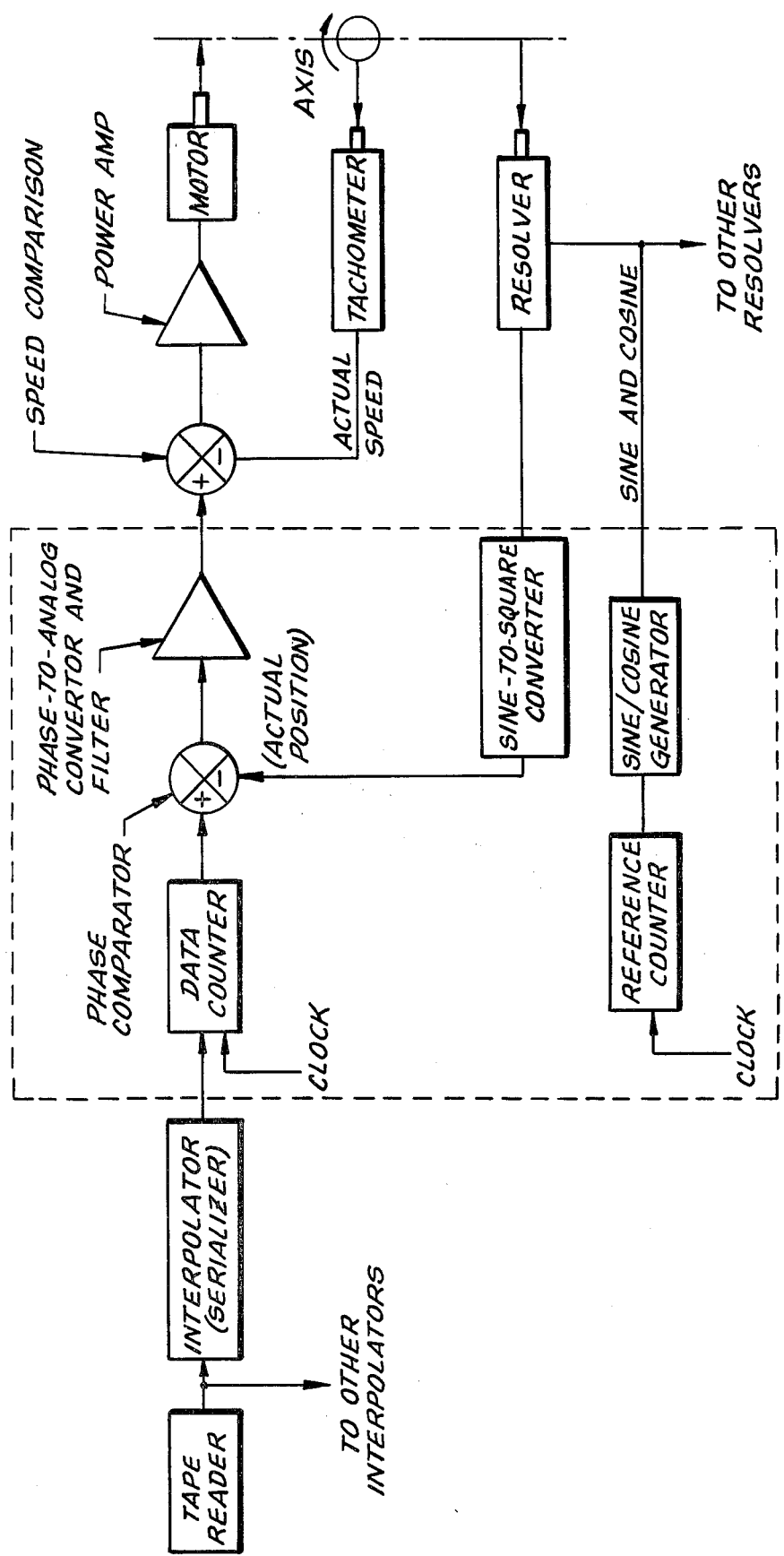

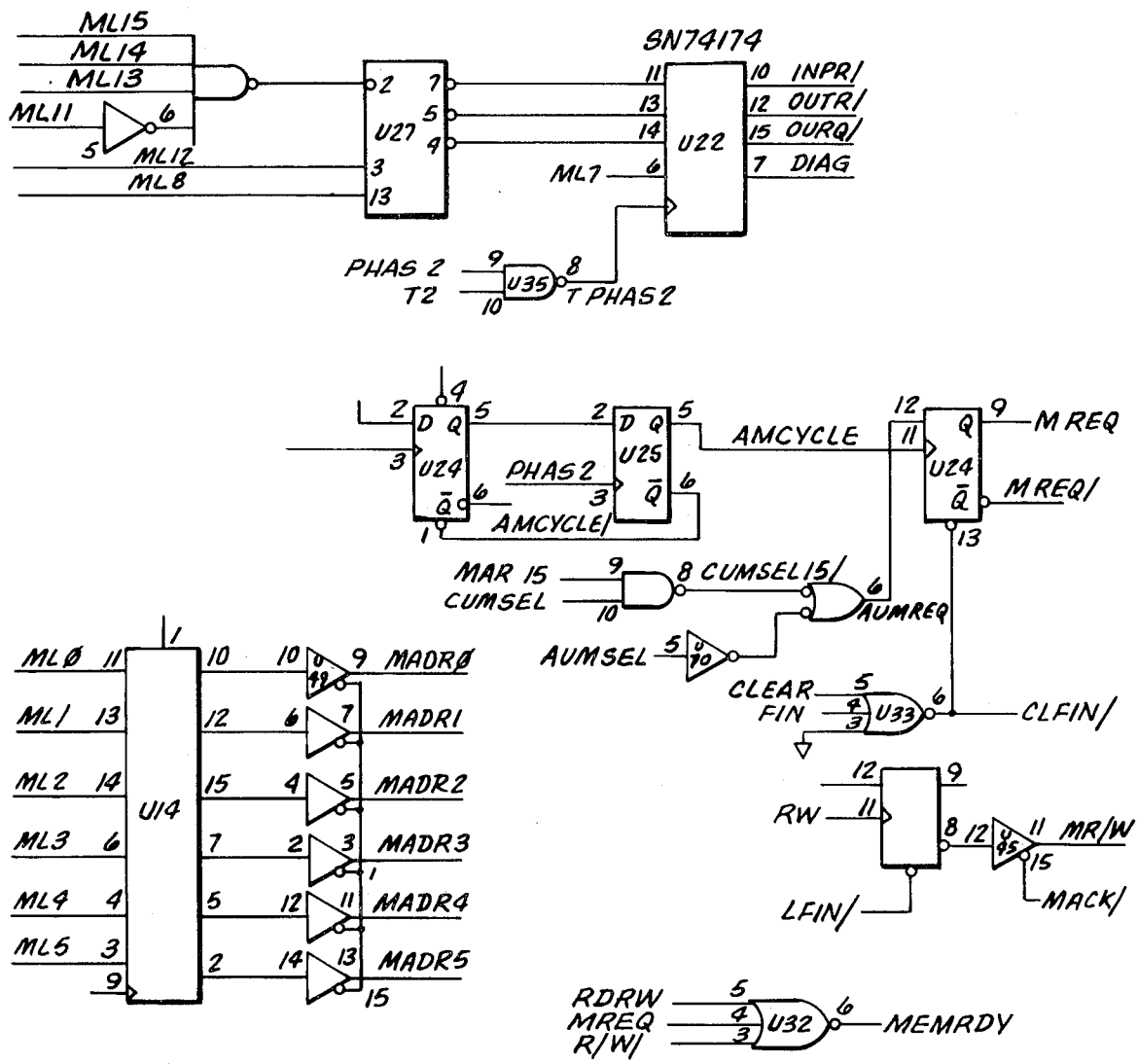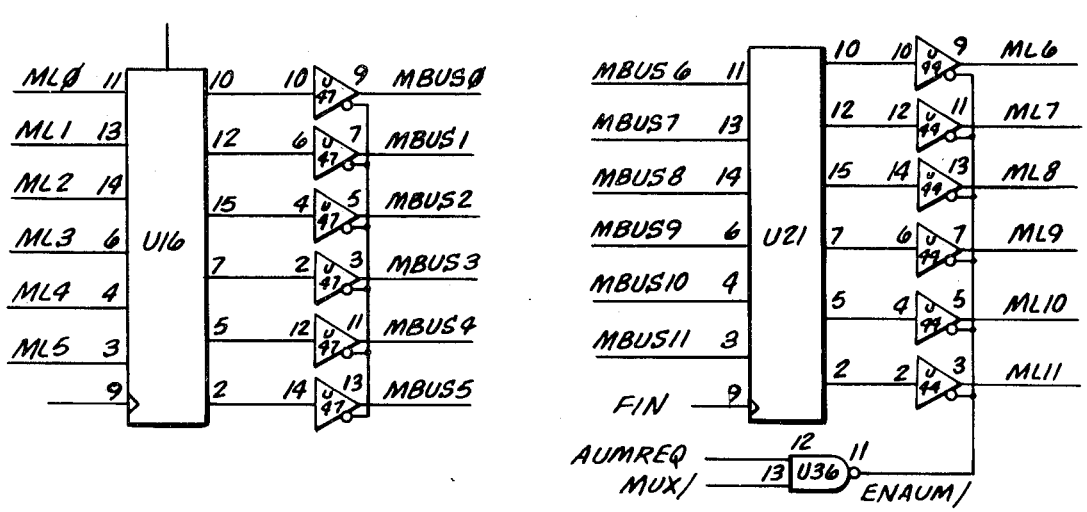
FIG.-8

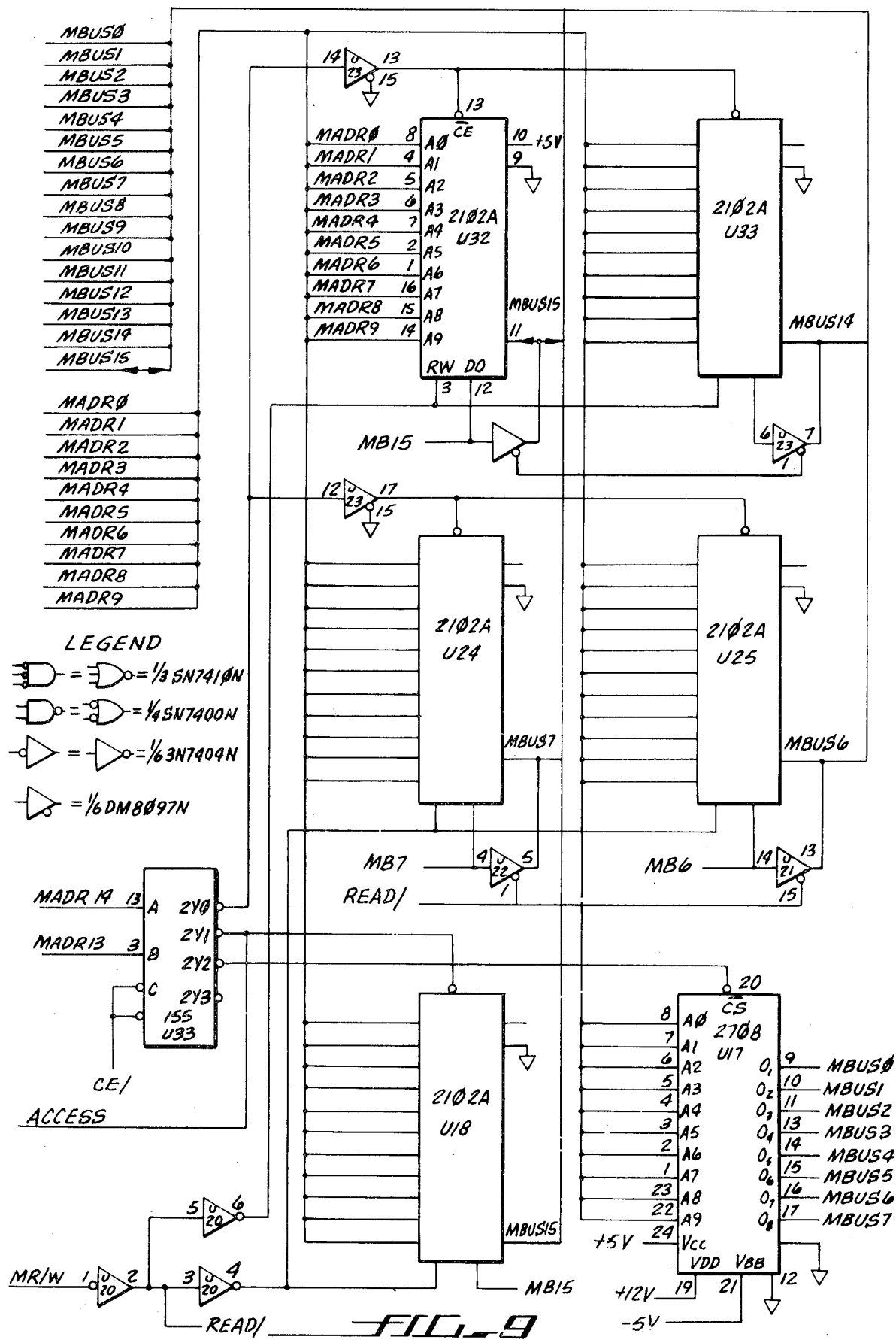

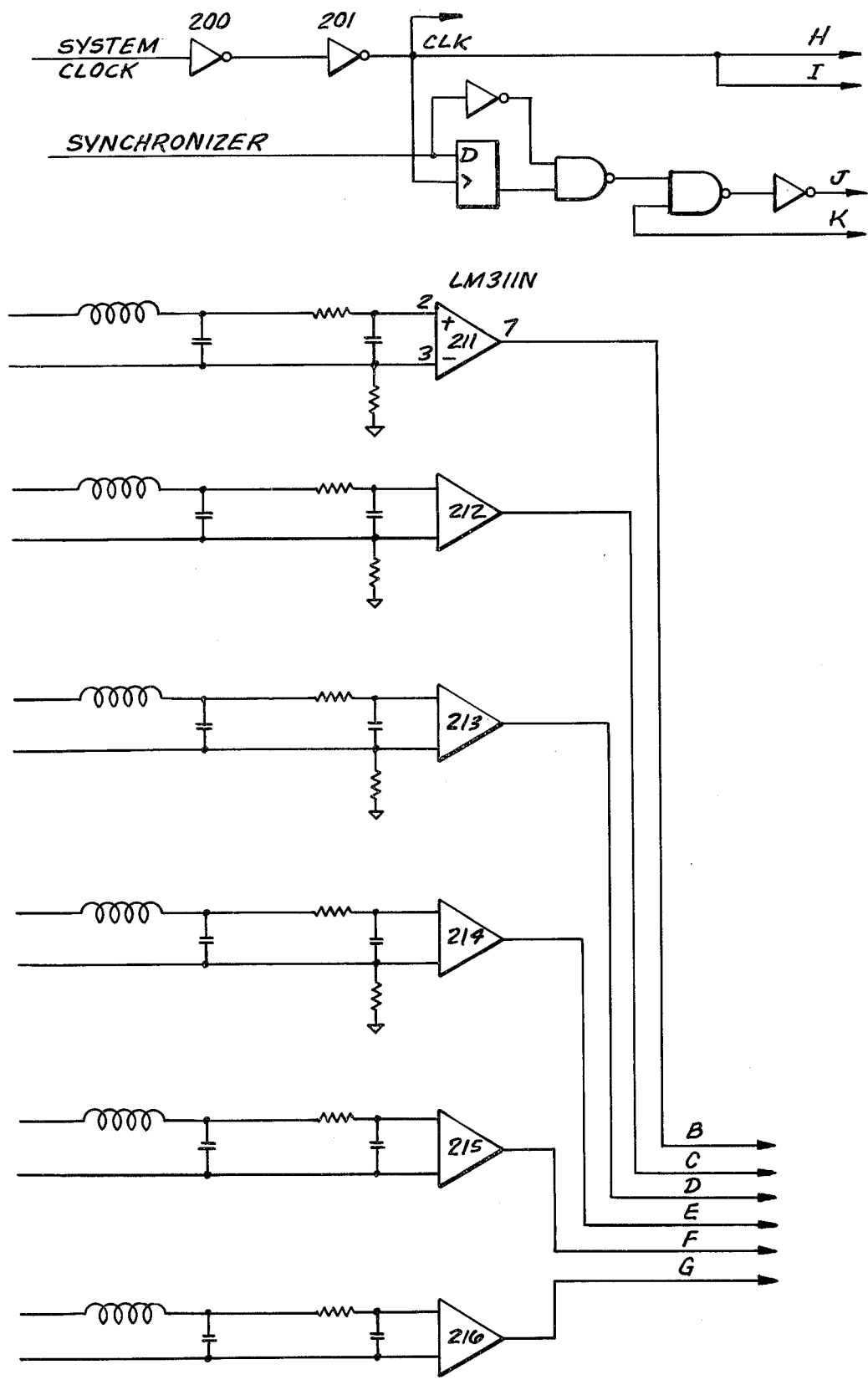
FIG_11D

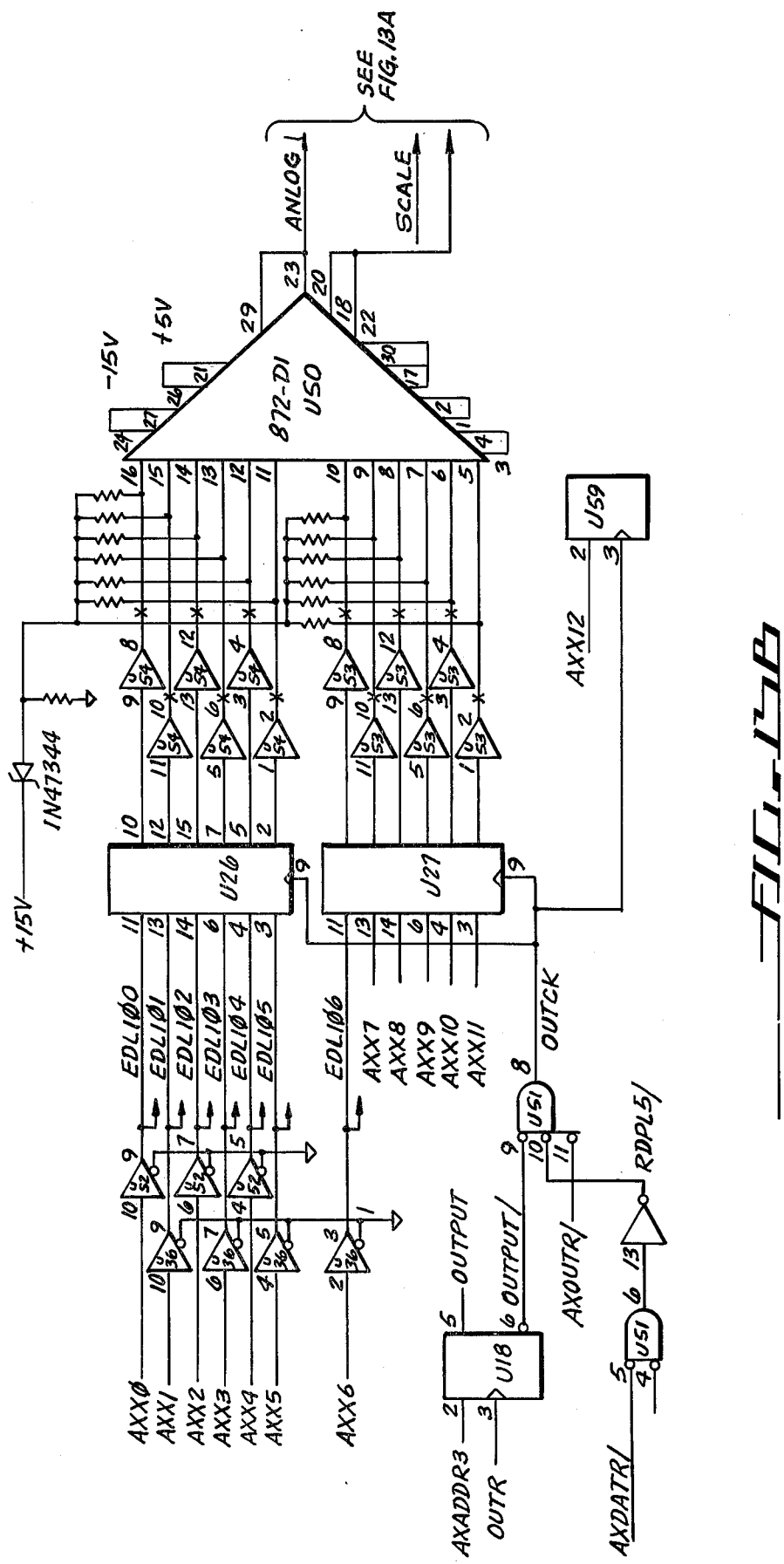

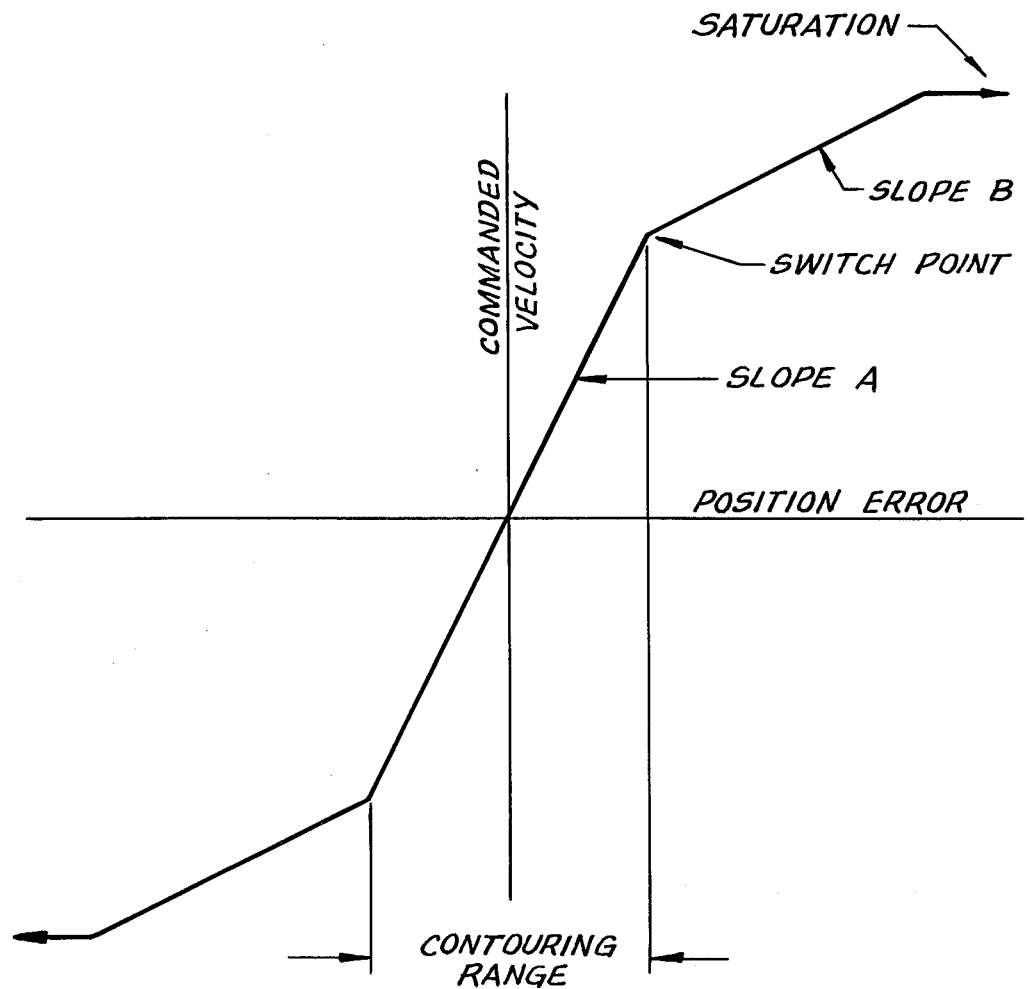
FIG_14

SERVO SYSTEM EMPLOYING DIGITAL COMPONENTS

BACKGROUND OF THE INVENTION

This invention is an improved servo system and pertains more particularly to equipment for controlling the motion of a plurality of axes in a numerically controlled machine tool.

Servo systems are widely used in the control of machinery where the rotational or translational position of a commanded element is controlled by the corresponding movement of a control element. Typically, a feedback transducer monitors the motion of the commanded element and sends back to a summing junction an indication of the actual position. The summing junction compares the actual positon with the commanded position, generating a position error which is used to correct the system.

A system of this type would be used, for instance, in numerically controlled machine tools like lathes and milling machines where data read from a paper tape would be used to command the positioning of a part being manufactured in a machine tool or of a cutting tool which is being used by a machine tool. Typically, the data read from the tape would specify the starting point, end point and path of said tool or part. Concurrently a position feedback transducer would generate a tool position signal which would be compared to the commanded position thus generating a position error and a corrected new position command, closing the servo loop. In this way a part could be produced on the machine tool that is an exact representation of the part commanded by the paper tape instructions.

The position feedback transducers usually are resolvers and comprise two sets of stator coils spatially placed 90° apart and driven by electrical signals that are themselves 90° apart (sin $\omega t$ and cos $\omega t$). A rotor is rotatably attached to the axis and rotates so that it will pick up from the stators an output sine wave varying in phase (sin $\omega t + \phi$). Thus, the output of a resolver varies in phase as the axis transducer varies in rotational position. This phase difference must then be converted into a voltage level before being sent to the summing junction.

Because of the mechanical linkages and voltage and phase comparisons, position control systems of this kind are relatively large, complex, and expensive, particularly when multiple degrees-of-freedom systems are to be controlled, each requiring its own complete control and servo system. Maintenance and adjustment are also difficult, particularly where great accuracy is sought, as in numerical control machining systems. What is needed in a numerical control machining system is a low cost and reliable position control system that may easily be calibrated to a high degree of accuracy.

SUMMARY OF THE INVENTION

The position control system described herein comprises a digital system including digital to analog (D to A) converters for generating the sine and cosine inputs to the plurality of resolvers, a level detector to convert the resolver outputs into digital signals, and one computer to perform the summing junctions for all axes. Also, a digital multiplexer, sample and hold, and decoder arrangement allows the use of a single dc source to perform the function of multiple servo loops in the prior art apparatus. The resultant system is low in cost and high in reliability through the substitution of integrated circuits for analog parts. Accuracy, stability, and ease of maintenance and calibration are also improved through the use of logic circuits which may be calibrated digitally. Finally, because digital techniques are involved, a variety of applications are possible that could not be implemented in the prior art apparatus.

It is thus an object of this invention to provide a computer numerical control system in a multi-axis machine tool that is reliable, low in cost, easily maintained and which can be accurately calibrated.

BRIEF DESCRIPTION OF THE DRAWINGS

FIG. 2A is a block diagram of a prior art servo control system.

FIGS. 6, 7A, 7B, 7C and 8 comprise a schematic of the computer used in the preferred embodiment of the axis controller.

FIGS. 9, 10A and 10B are a schematic of the common data memory;

FIGS. 11A through 11D are a schematic of the axis controller logic board;

FIGS. 13A and 13B are a schematic of the circuit which produces an analog velocity error for each axis.

FIG. 14 is a typical servo gain function curve.

DETAILED DESCRIPTION OF THE INVENTION

Figure 1:
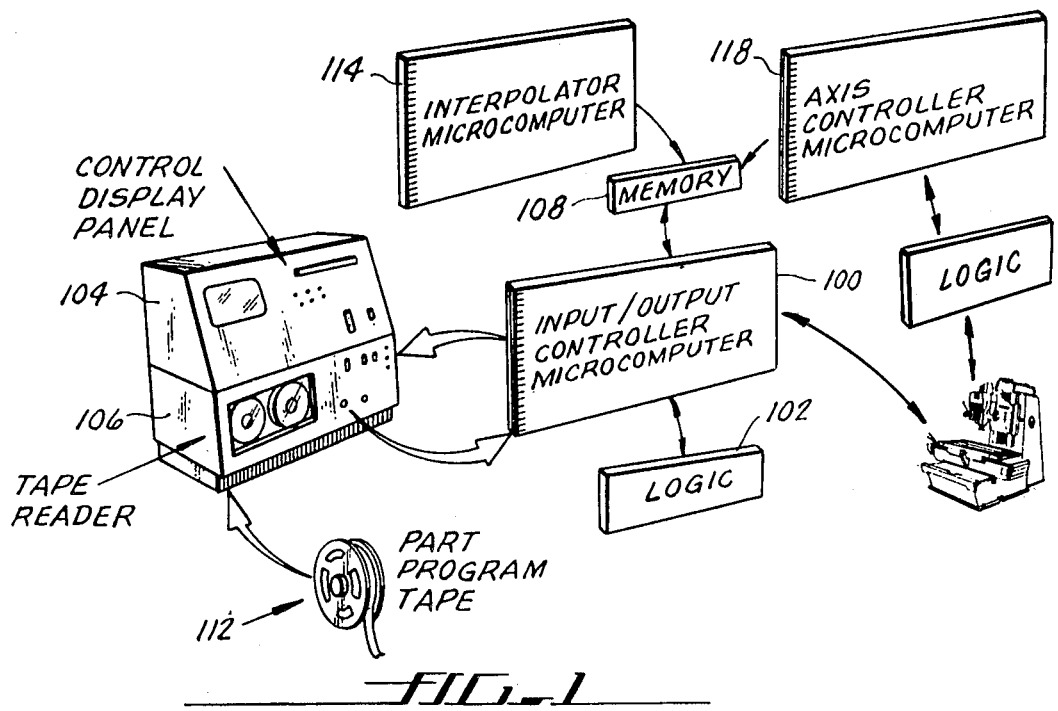
FIG. 1 is a pictorial diagram of this numerical control system.

FIG. 1 is a pictorial diagram of this numerical control system showing its main components. Computer 100, the input output controller, and its associated logic 102 controls the flow of information between the control display panel 104, the tape reader 106, the common data memory 108 and a machine tool 110. Numerical data for the machining of a particular part is read in from a tape 112, paper or magnetic, through tape reader 106. This information is received by the input/output controller 100 and is loaded into common data memory 108. Likewise, particular bits of information are received from the controller display panel representing the status of various switches set by the operator, and various bits of information are received from the machine tool such as the status of overlimit switches, temperature gauges, etc. Output from the input/output controller is fed out to the control display panel to drive certain indicators and display lights, and other data is output to the macine tool to control various machine functions.

Computer 114 is an interpolator. It receives basic part shaping data from the paper tape reader 106 through the input/output controller 100 and from these simple commands representing curves of various kinds generates detailed machine instructions in real time. As an example, a simple radius is comprised of a large number of discrete machine tool movements. The particular piece-by-piece movements are calculated in the interpolator 114 and are output to the axis controller 118 for eventual control of the machine tool 110.

Computer 118, the axis controller, controls six servo loops corresponding to up to six axes of the machine tool. In this system the inputs to each axis resolver are sine and cosine waves and the output from each axis resolver is a sine wave displaced through a certain phase angle determined by the axis position. However, these sine and cosine inputs are generated from a digital to analog converter. The resolver output is converted into digital form and all the remaining elements of the loop are computed digitally, the entire process being controlled by axis controller 118.

As shown in FIG. 1, common data memory 108 is available to all three computers and all transfers of information from one computer to another comprise the loading of the particular information by one computer into common data memory 108 and the reading of that data from common data memory by the using computer. In addition to common data memory 108 each computer has its own control memory implemented from read only memory devices for permanent data storage and storage of control memory programs. As a general rule, programs and data stored in the control memory of the input/output controller 100 tailors the system to the particular machine tool while the data pertaining to the machining of a particular part is typically loaded in from tape 112 through the tape reader 106 and through the input/output controller to the common data memory 108 where it will be used by the interpolator to produce instructions for the machining of the particular part.

FIG. 2A is a simplified block diagram of a prior art axis controller. With the exception of the tape reader the equipment shown in this figure controls a single axis.

The tape reader generates and transmits to each of up to six interpolators a data block which defines an entire tool path segment. Simply stated each data block contains the end point and a definition of the path the tool must follow in the interim, (e.g., linear or circular). The interpolator, in this case, is a circuit which translates the data block information into a serial pulse stream where each pulse represents an incremental repositioning of the pertinent axis and wherein the number of pulses produced corresponds in real time to the amount of motion of the axis. The counter also receives a standard frequency clock pulse input. The serial pulse stream modifies the output of the counter so that the axis motion defined in the data block will be converted into a phase shifted square wave output from the counter. This signal becomes the commanded position.

Simultaneously, a resolver which is connected mechanically to the axis generates a sine wave whose phase is also proportional to the axis angular position. The resolver output is converted into a square wave which is therefore phase shifted in relation to the position of the axis. The square wave output from the resolver and the square wave output from the counter then can be compared in a phase comparator. To the extent that the axis position does not agree with the commanded position as determined by the counter output, there will be a phase comparator digital phase difference output corresponding to a position error which, when amplified through a phase-to-analog converter will result in an analog voltage defined as a speed command. This command is amplified in a power amplifier and is used to drive the axis motor. In this way the motor will be driven in a direction to reduce the amount of difference between the actual and commanded axis position. A tachometer, mechanically connected to the axis, produces an electrical signal proportional to the speed of the axis which is compared, at a speed comparison summing junction, with the original speed command. The result is used as the input to the power amplifier. Thus, the complete system has an outer position loop and inner speed loop. The sine and cosine reference signals to the resolver are generated by counting down the system clock into a digital-to-analog sine/cosine generator. The area of FIG. 2 enclosed within the dotted lines has been replaced in the instant invention by computer functions which will be described in more detail below. A large savings in hardware cost is effected since six axis control channels, of which one is shown in FIG. 2A, may be replaced by the single axis controller described in this specification.

Figure 2B:
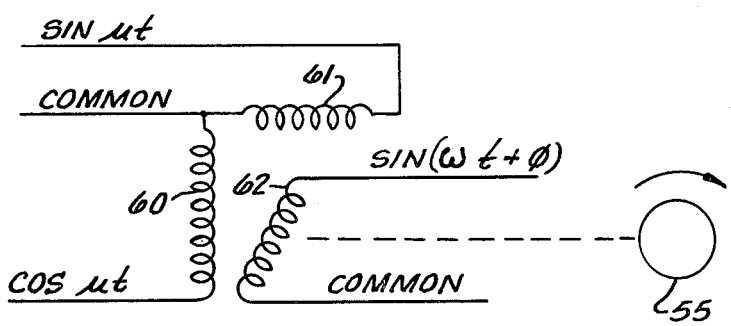
FIG. 2B is a schematic of a resolver.

The resolver of FIG. 2A is shown in more detail in FIG. 2B and comprises two stator windings 60 and 61 spatially oriented 90 degrees apart and driven by two 3.125 kilohertz ac sine waves 90° out of phase. The output of the rotor winding is sine, $(\omega t + \phi)$ which is in phase with the rotation of axis 55. This phased sine-wave output must be converted into a square wave signal before it can be used as an input to the position summing junction of FIG. 2A. In a six axis machine tool there will be six resolvers.

Figure 3:
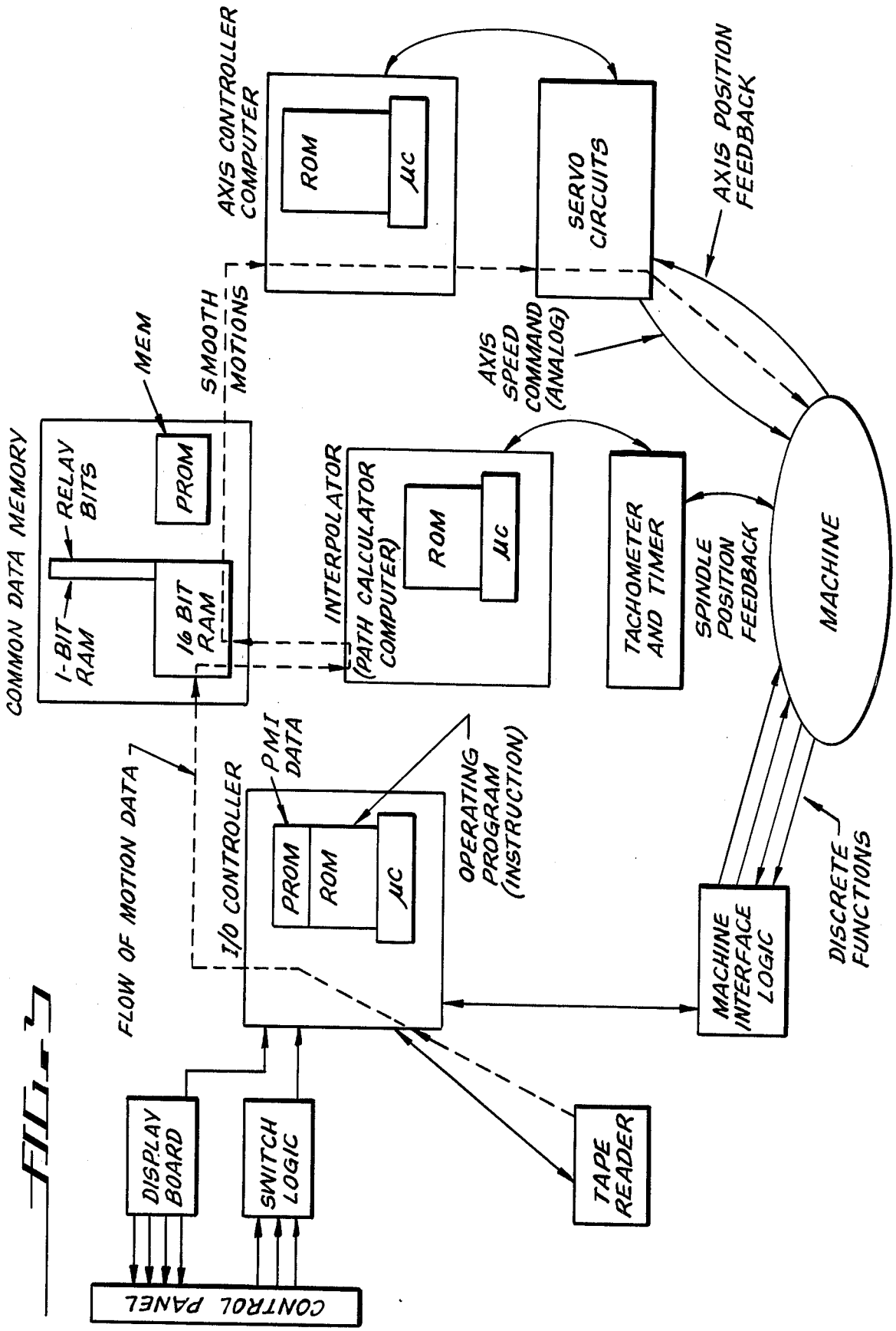
FIG. 3 is a detailed functional block diagram of the servo system.

FIG. 3 is a more detailed functional block diagram of the system showing the three microcomputers.

In this diagram the flow of motion data, that is, the data used to control the motion of the part or tool in up to six axes of rotation, generally follows the path represented as a dotted line. The digital codes representing the tool or part motion for each axis are read from the tape reader through the input/output controller to be loaded temporarily into the common data memory. These codes are similar or identical to codes that are normally received from the tape reader in prior art systems and define the starting point and end point of a part or tool movement and the path that the part or tool should take in going from the starting point to the end point. Tape reader data is stored in the 16 bit random access memory section of the common data memory.

The interpolator, which is the computer used to calculate the instantaneous tool and part positions, will access this motion data from common data memory and will compute the step by step smooth motions in real time that will lead the tool or part through from the beginning point to the end point along the path designated by the tape reader. These smooth motion data packets are then loaded back into common data memory where they are available to the axis controller computer for providing positioning information to six sets of servo circuits, each controlling an axis. The servo circuits provide an analog axis speed command to the motor driving each machine axis.

A second main channel of information transfer is used to control the digital functions of the machine tool. These functions are the turning on of coolant flow, the providing of power through interlock systems, the indexing of tools, and the turning on and subsequent speed selection of the spindle motor, for example. Data for controlling these discrete functions is read in from the tape reader through the input/output controller and is fed directly through the machine interface logic to control the machine. The machine may likewise receive instructional data from the operator through the activation of various switches and push buttons on the control panel. The flow of this data is from the control panel through the switch logic, through the I/O logic controller and through the machine interface logic to the machine. Finally, data available at the I/O controller, either from the tape reader or from the machine, may be transmitted through the display board to the control panel for display to the operator.

The apparatus for controlling the on/off functions of the machine through information read from the tape reader or received from the control panel may be broadly referred to as the programmable machine interface since this apparatus serves the function of the various relays and circuits required in a prior art system to control the machine functions as a result of information received from the tape reader. Since this machine interface is implemented, not from hardware but from a programmable computer, the reconfiguration of the system is accomplished by reprogramming the input/output controller. Specifically, the symbolic relay diagram required to tailor the numerical control system to the particular machine tool and to the particular use to which the machine tool will be put is referred to as programmable machine interface (PMI) data and is loaded into one part of the memory of the I/O controller which is implemented from programmable read only memory (PROM) devices. The remainder of the memory, comprising read only memory (ROM) devices is used to store the operating programs or instructions for the computer. Thus, the contents of the PROM and ROM memory provide operating instructions and data for the microcomputer. Given this configuration the input/output controller accomplishes the on/off functions of the machine including tape reader control data input, data display, discrete inputs and outputs to and from the machine tool, implements the programmable machine interface and drives the analog to digital converter. These functions will be discussed in more detail below.

The PMI data is in the form of symbolic relays to control all the functions of the machine tool, the relay implementations actually being one bit for each symbolic relay contact. The relay section of the common data memory therefore comprises a one bit by one thousand word random axis memory, where each bit will either be on or off to symbolically represent whether the contact of each relay is closed or open. Using this system, the PMI data in the PROM of the I/O controller, therefore is simply a collection of addresses of bits in the common data memory. Since the "relays" are contained within the common data memory and I/O controller memory, it is programmable since any combination of relay functions may be implemented simply by reprogramming the input/output controller.

The common data memory also contains a 16 bit RAM for temporary storage of data received from the tape reader and a programmable read only memory for storing permanent data. The interpolator comprises a microcomputer and programs stored in a read only memory. The interpolator receives data from the tape reader through the common data memory and generates smooth motions in real time which are reloaded into common data memory for reference by the axis controller. One input to the interpolator is spindle speed and position information which is received through a circuit board containing tachometer and timer circuits.

The axis controller also comprises a microcomputer and a read only memory. The function of this computer is to drive six servo circuits. The axis controller receives information through the servo circuits indicating the actual position of the axis to be controlled, receives motion commands from the interpolator through the common data memory as to the desired position and outputs to the servo circuits a speed command proportional to the difference. The servo circuits produce the appropriate outputs to drive each of the six servo axes, and an axis position indication is received back from each axis resolver to close the servo loop.

FIG. 3, then, is an overall functional diagram of the system. Each particular part of the system will be discussed in more detail.

Figure 4:
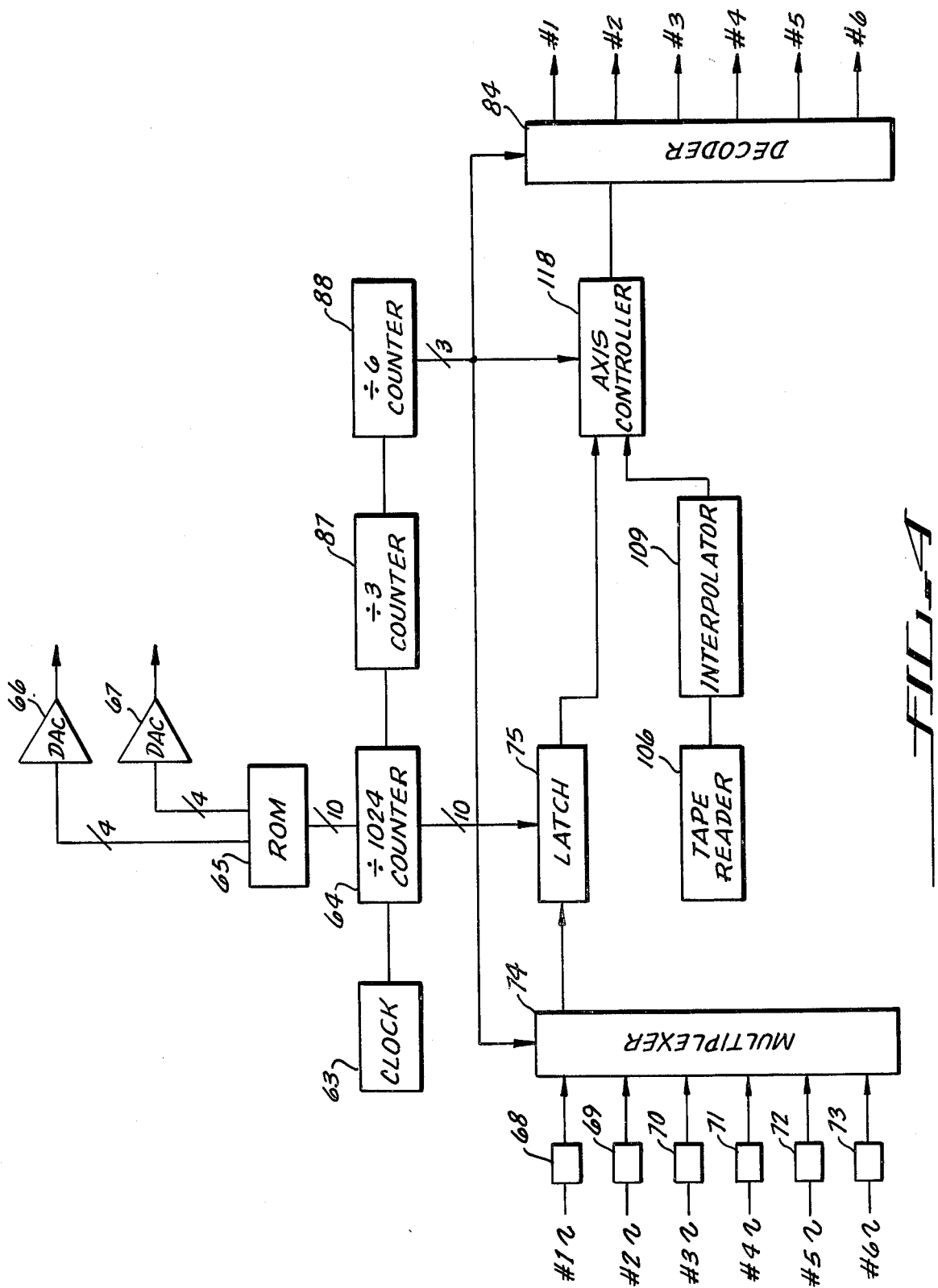
FIG. 4 is a block diagram of the servo control circuit.

In the preferred embodiment of this invention the sine wave inputs to all resolvers are produced by digital to analog converters and the sine wave output from each resolver is converted into a digital pulse whose timing is proportional to the phase of the sine wave output of the resolver. This is shown in FIG. 4, a simplified block diagram, where digital clock 63 produces a binary output of approximately 3 megahertz which is counted down by a mod 1024 counter 64 which cycles at the rate of 3,125 full counting cycles per second. The 10 output lines are connected to a read only memory (ROM) device 65 as address lines, producing two sets of four binary outputs which are used as inputs to two D to A converters 66 and 67. ROM 65 is programmed so that as the counter steps through a complete 1024 step cycle, the outputs from the ROM 65 produce a digital signal which, when converted into a voltage level by D to A converters 66 and 67, will produce at the outputs of these two converters a signal closely resembling two sine waves 90 degrees out of phase. Of course, upon close inspection these outputs will appear to be step functions rather than pure sine waves but subsequent filtering produces a voltage wave shape functionally equivalent to a pure sine wave. These outputs are used to drive the six resolvers in the system.

The six sin $(\omega t + \phi)$ resolver outputs are received by this system and are applied as inputs to six zero crossing detectors 68 through 73, the output of each being a binary signal whose output switches at the time when the input sine wave signal passes through the zero crossing point.

The divide-by-six counter 88 provides logic signals for controlling the multiplexer 74 to select and output one zero crossing signal to the latch 75 which captures the instantaneous output of counter 64. This count is then read out by the axis controller 118 and used to compute present axis position. In this manner, the phase variation of each sine wave input to the zero crossing detectors 68 through 73 is converted into a discrete binary count. Additionally, since the same mod 1024 counter 64 is driving the D to A converters 66 and 67 which result in the sin $\omega t$ and cos $\omega t$ signals, it is seen that the phase variation between inputs and outputs at the resolver have been translated into binary count form at latch 75. This phase information in binary form is used to compute position and is then applied to the digital summing junction, which in this embodiment is an arithmetic logic unit (ALU) of a computer 118.

The main funtion of the axis controller 118 is to accumulate small motion commands from the interpolator 109 to generate axis position, compare that to what it computes as the actual position and output speed commands through decoder 84 to the six axis drive systems. The timing for coordinating the multiplexing and decoding of six sets of signals is generated by outputting the mod 1024 counter 64 overflow bit into a mod 3 counter 87 and mod 6 counter 88. At the rate of 174 times per second, the outputs from these counters will be used to select one input to the multiplexer 74, which will then "capture" the state of the mod 1024 counter. When the computer interrogates the logic, it will find that there is data ready; the data consists of the axis number (1-6) and the current position of that resolver. The computer will compute the current axis position, compare that to the current accumulated command position, compute from the result the desired correction voltage, and output that voltage to the proper axis through the D/A and sample/hold circuits.

Figure 5:
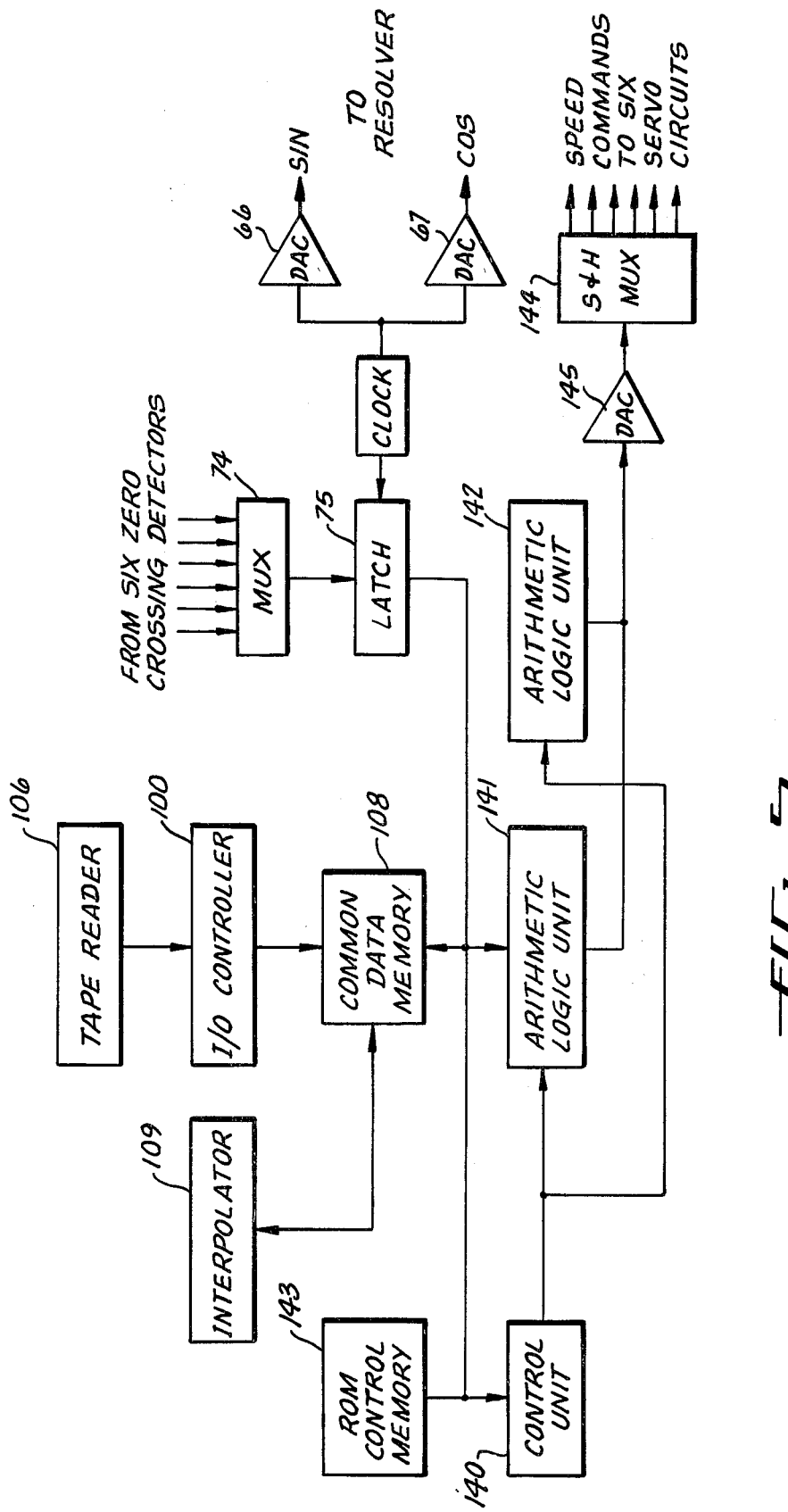
FIG. 5 is a more detailed block diagram of the axis controller.

FIG. 5 is a simplified block diagram of the axis controller 118 of FIG. 1. As shown in FIG. 5, the basic microcomputer comprises one control unit 140, two arithmetic logic units 141 and 142 and a control memory 143. Each arithmetic logic unit in the preferred embodiment is capable of handling eight bits of data and since this system is designed to handle 16 bit words in parallel, two arithmetic logic unit chips 141 and 142 are required.

The control memory 143 is implemented from read only memory devices and contains all of the programming required to fulfill all of the computer functions and also contains certain permanent data information. Control programs are executed in the control memory 143 resulting in a series of op codes or instructions being issued from the control memory 143 to the control unit 140. The control unit 140 interprets these instructions and causes, by means of control lines, arithmetic logic unit 141 and 142 to perform the functions of the original instructions received from the control memory 143. For example, if an op code specifies an add operation, then the control unit will control the arithmetic units to add the specified numbers.

Random access read/write memory is supplied for this system in a common data memory board 108 which may supply or receive either data from the arithmetic logic units or instructions to the control unit. The common data memory can be supplied with data through an input/output controller 100 which may ultimately be connected to a tape reader 106 or some other device. Thus, six continuing series of commanded positions and other machine tool control information is received through the tape reader 106 and through the input/output controller 100 to be loaded into common data memory 108 for use by this system.

One set of data inputs to the axis controller computer is the six resolver outputs. This information is received from zero crossing detectors to be applied through a multiplexer 74 to the arithmetic logic units 141, 142. Speed commands are generated from this feed-back and output to a sample-and-hold multiplexer (144) through a DAC (145) for use by the six servo circuits. Additionally, the clocks and counters of FIG. 4 are used to control the sample and hold multiplexer of FIG. 5 so that the appropriate axis data will appear at the arithmetic logic unit simultaneously with the corresponding commanded position data to the servo system. Simultaneously, the clock drives the D to A converters 66 and 67 generating sine and cosine references used as the sin $\omega t$ and cos $\omega t$ outputs to the six axis resolvers.

FIGS. 6, 7A, 7B, 7C, and 8 comprise a schematic of the axis controller computer used in the preferred embodiment. The discussion of this computer will relate to the control unit 140, the ROM 143, and the arithmetic logic units 141 and 142 of FIG. 5 but, in fact, the input-/output controller computer 100 and the interpolator 114 of FIG. 1 are identical units.

Figure 6:
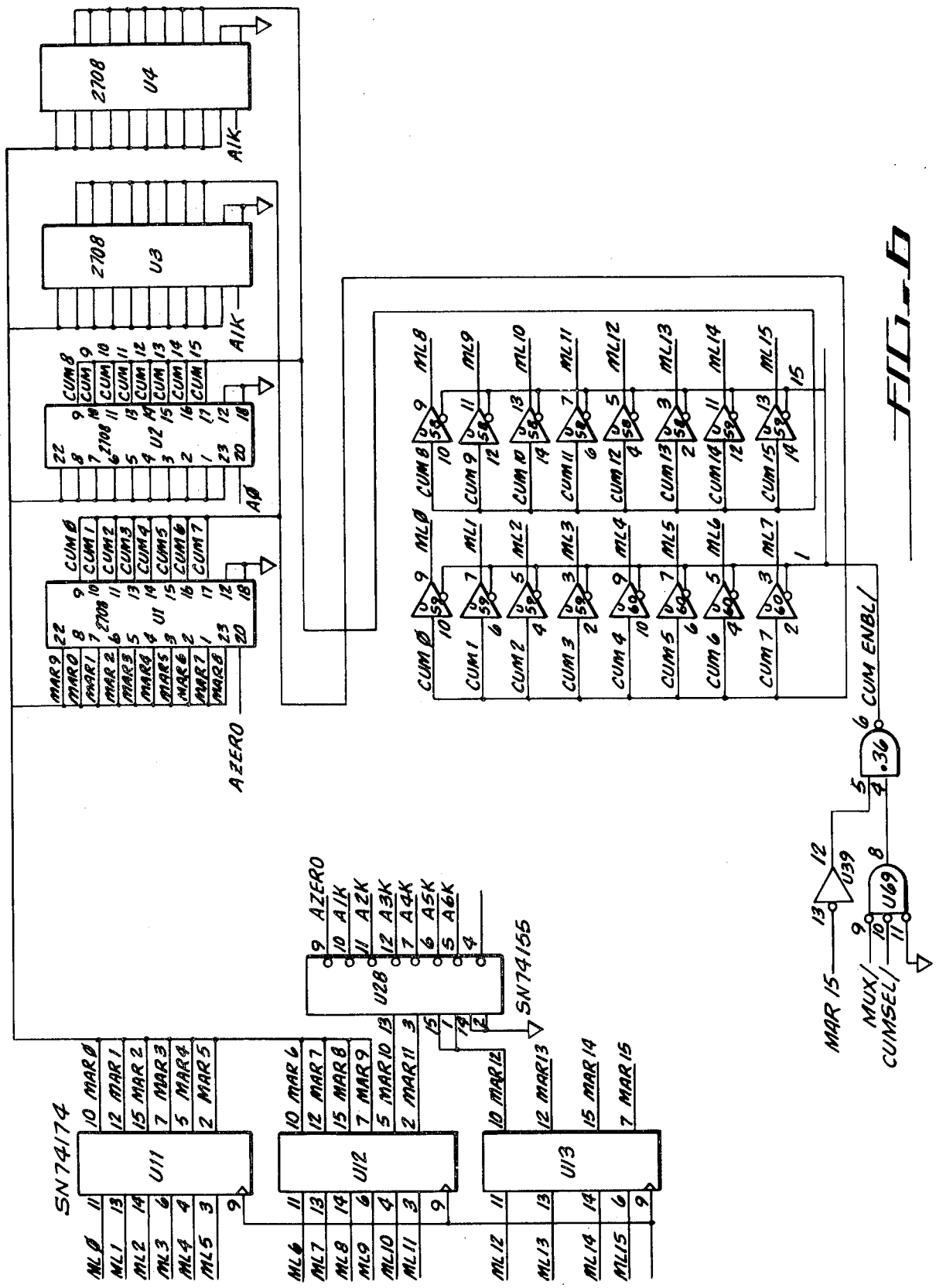

In FIG. 6, devices U1 through U4 are eight bit by 1K programmable read only memory (PROM) devices.

The computer may contain up to 14 of these devices but only four are shown since the remaining circuits are identical. These devices contain all the programs required by the axis control computer in this numerical control system. The devices receive their addressing information on lines MAR0 through MAR9 and the eight bit data words are output on lines CUM0 through CUM7. Since the computer is organized around a 16 bit word length these PROM's are always used in pairs with the second PROM of each pair supplying the other eight bits of the data word, CUM8 through CUM15. The devices are selected through select lines AZERO, A1K, etc. Addressing information is initially received on lines ML0 through ML15 and is temporarily stored in registers U11, U12, and U13 during the PROM read and write cycles before being output onto the MAR0 through MAR9 address lines. Decoder U28 decodes the high order address bits into device select bits AZERO through A6K. The address lines ML0 through ML15 are received from the circuits shown on FIGS. 7A, 7B and 7C. The 16 bit output data words are buffered through devices U58, U59 and U60 of FIG. 6 and are output on lines ML0 through ML15 which is a bi-directional data bus between this control memory and the schematic shown in FIGS. 7A, 7B and 7C.

Figure 7A:
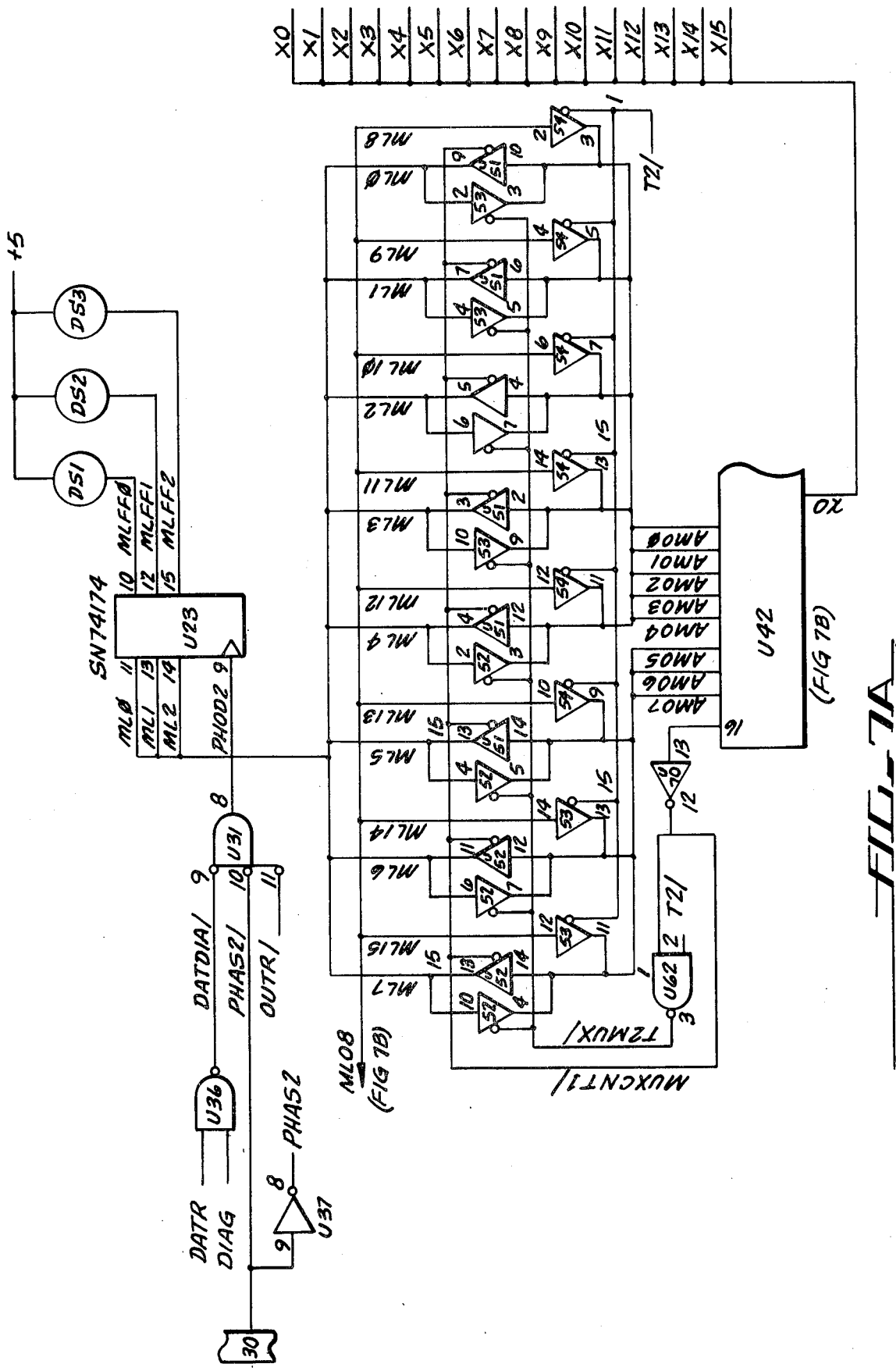
Figure 7B:
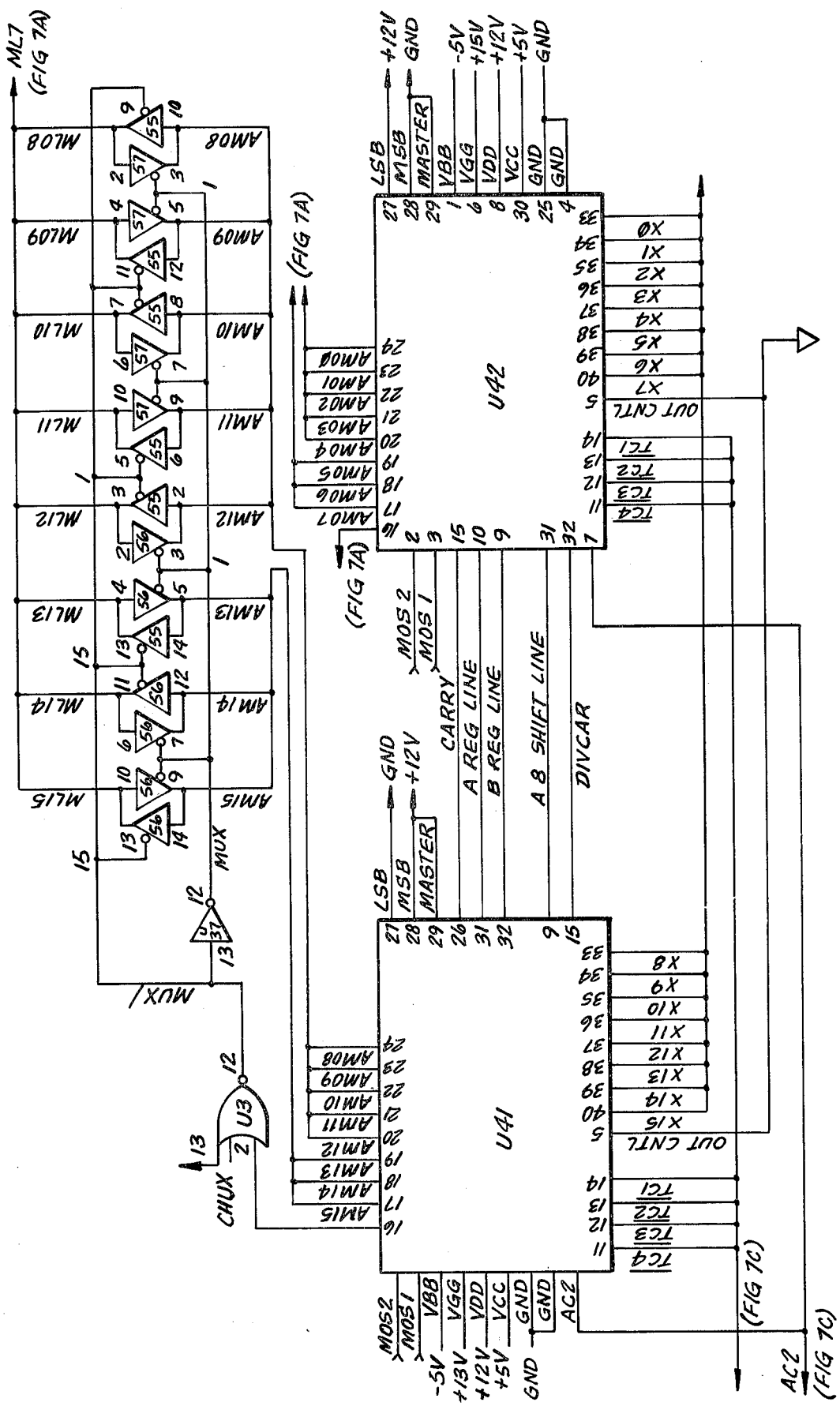
Figure 7C:
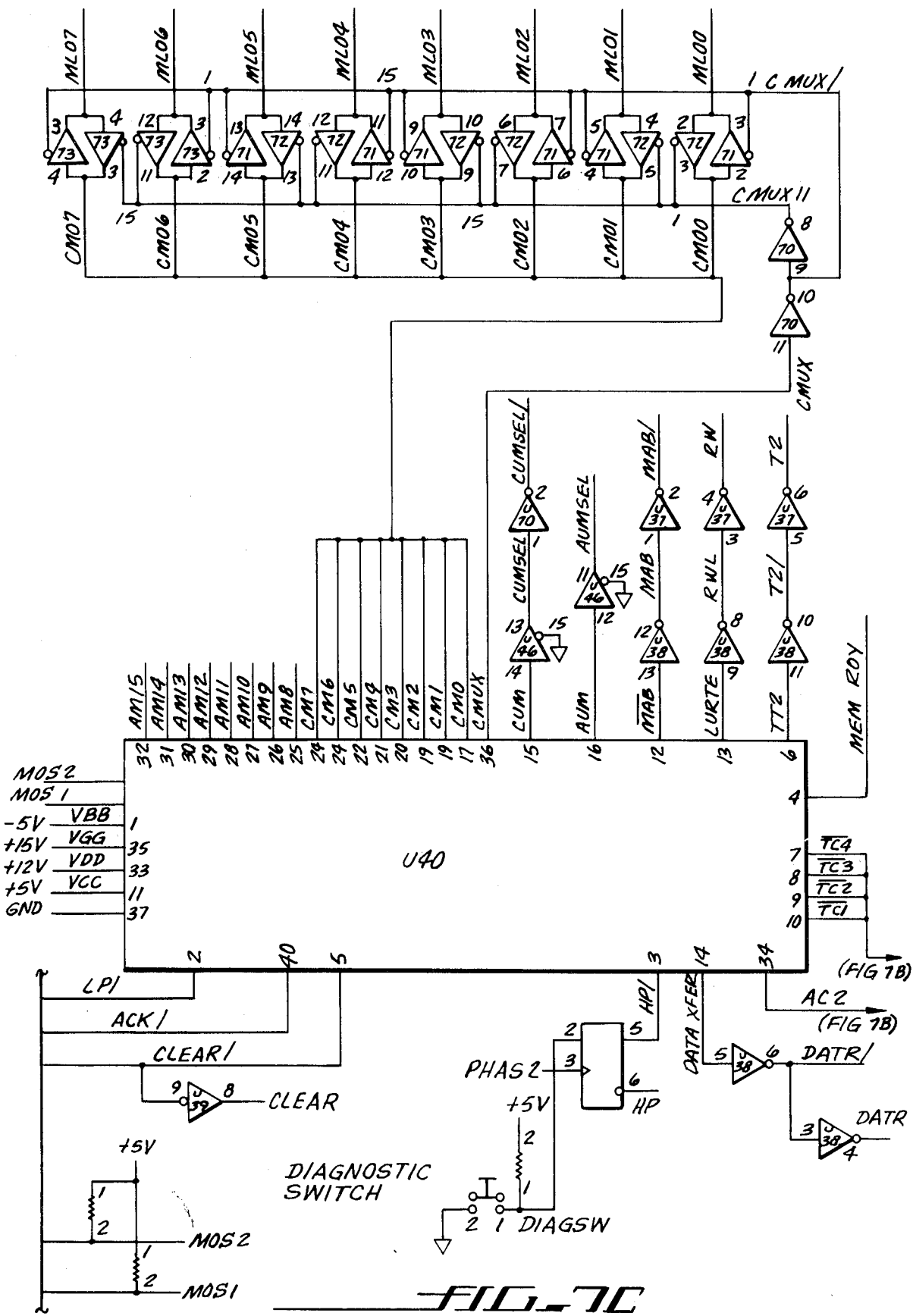

The bi-directional MS address and data bus is shown on FIGS. 7A, 7B and 7C as lines ML00 through ML15. Tristate devices U51 through U73 are used to direct address data out to the control memory or to direct data or instructions back from the control memory.

This data and instruction information is received by the computer which is a three chip set U40 of FIG. 7C, and U41 and U42 of FIG. 7B on lines AM00 through AM15 and CM0 through CM7. Device U40 is an instruction decoder (control unit 140 of FIG. 5) and devices U41 and U42 are each eight bit arithmetic logic units (ALU), 141, 142 of FIG. 5. The entire three chip set therefore comprises a 16 bit microcomputer. In a typical operation, instruction information is received from the control memory at the decoder U41 instruction decoder at lines CM0 through CM7 where they will be interpreted. The appropriate control lines from decoder U40, $\overline{TC1}$ through $\overline{TC4}$, direct ALU U41 and U42 to operate on the data being received at data lines AM00 through AM15 or instruct arithmetic logic units U41 and U42 to output certain data on lines AM00 through AM15.

A second set of 16 data input/output lines are provided to the arithmetic logic units U41 and U42 through lines X0 through X15. As will be described in more detail below, these are the lines on which the speed command is output from the computer to the servo.

These three chips comprising microcomputer elements U40, U41 and U42 are typical instruction decoder and arithmetic logic units, similar to Motorola Part No. 6800. At the bottom of FIG. 7C is a diagnostic switch which, when depressed, generates a discrete signal activating the execution of a diagnostic subroutine contained within the control memory. The results of this diagnostic routine are transmitted to device U23 of FIG. 7A through data lines ML0 through ML2 and result in a coded pattern of lights displayed by lamps DS1 through DS3. This diagnostic routine also generates sawtooth test patterns to test the D-to-A converter circuit. The remainder of the logic in FIGS. 7A, 7B and 7C generates miscellaneous logical functions.

FIG. 8 is a schematic of the remainder of the data bus structure. Because of the redundant nature of the circuits, only six of each set of 16 address lines are shown. The common data memory board receives its addressing information on MADR0 through MADR15 through register U14 from the ML line of the microcomputer data bus. In a similar fashion the common data memory board data bus is driven by lines MBUS0 through MBUS15 through register U16 from the same ML lines. Finally, data from the common data memory is received through lines MBUS0 through MBUS15 and is transmitted through register 21 to the ML lines of the computer. Some memory cycle logic is also shown in this diagram. The logic provides that when a computer requests a memory cycle, the computer is put into a hold state until that memory cycle has been granted. At the conclusion of the memory cycle the data will either have been read out of or read into the common data memory.

Figure 10A:
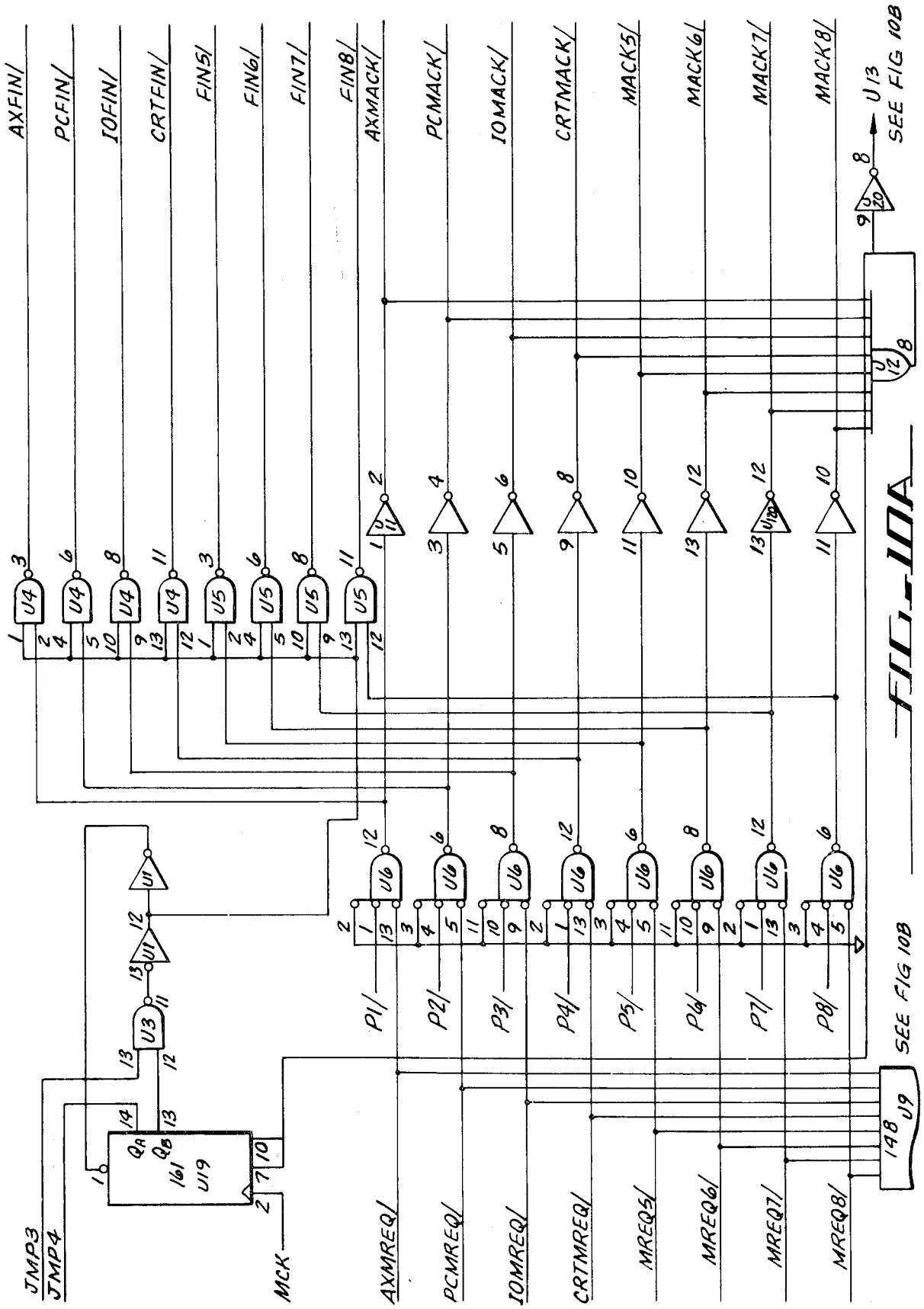
Figure 10B:
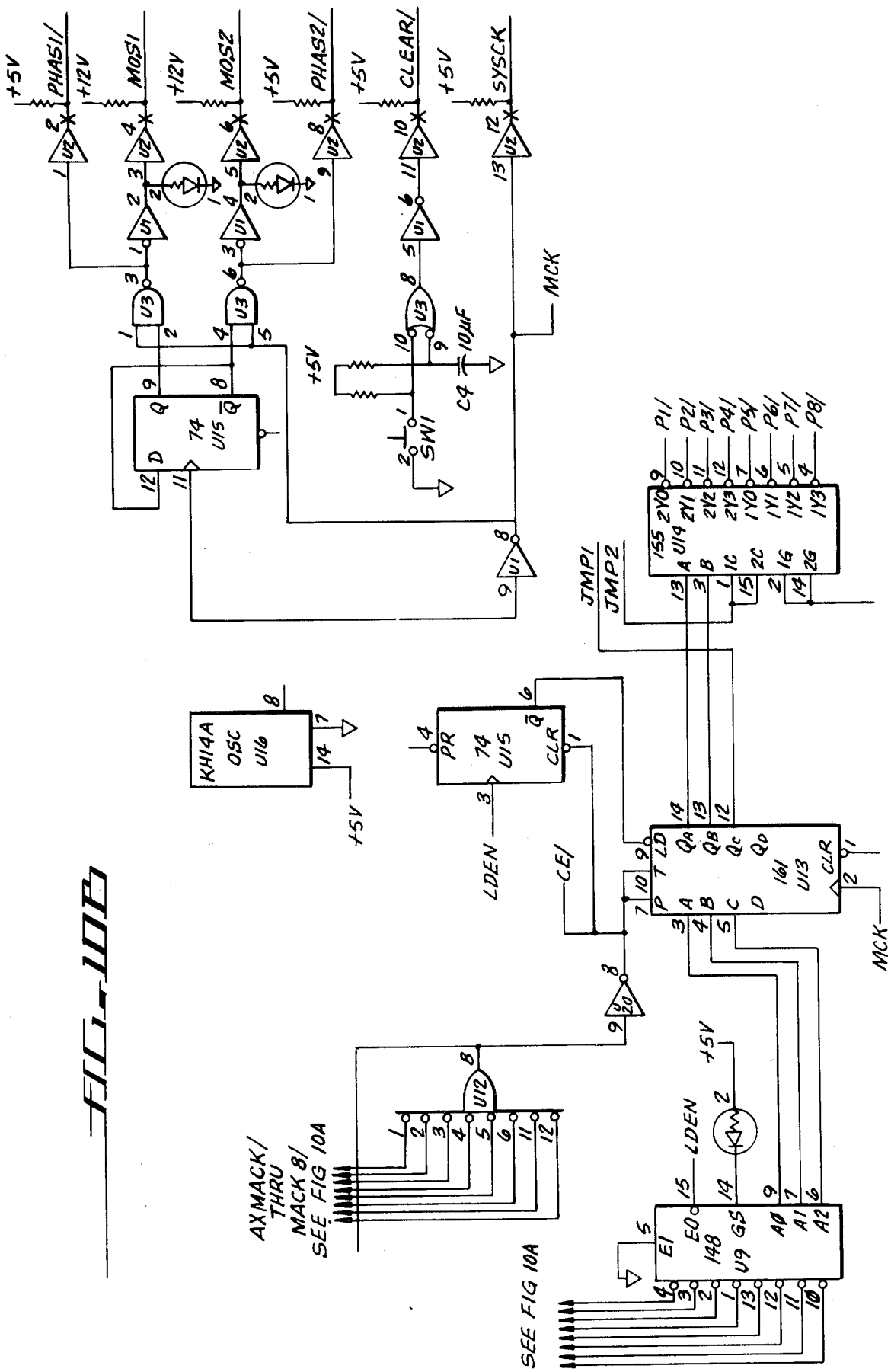

FIGS. 9, 10A and 10B are schematics of the common data memory. FIG. 9 is a schematic of the memory devices themselves. There are 16 1K (1024) by 1 bit RAM devices identified as U24 through U39. Because of the redundant nature of this memory only devices U24, U25, U32 and U33 are shown. Since the 16 bit devices are used in parallel, the capacity of this random access memory is 1K 16 bit words. The devices are addressed in parallel through addressing lines MADR0 through MADR9 which are received from the computer unit. Each device contributes one bit and an assembled 16 bit word is output on lines MBUS0 through MBUS15. Pin 11 of the device is both an input and an output and therefore the MBUS lines constitute a bi-directional 16 bit data bus communicating with the computer unit as shown in FIG. 8.

An additional two memory devices U18 and U17 are also provided in this common data memory schematic. U18 is a 1K by 1 bit RAM containing the status of all the flag bits used by the computers of this system. This device is also addressed by addressing lines MADR0 through MADR9 and one bit input/output is communicated to the computer on line MBUS 15.

Erasable PROM U17 is a 1K by 8 bit device erasable and programmable by the user to store various parameters of the individual machine that are relatively permanent but may change from time to time. These parameters include servo stiffness, slopes, and break points. The latter will be explained in more detail below. These are values that remain fixed for long periods of time but may be changed by the user from time to time to accommodate machine wear or a different mode of use. In its real time computations, the computer will need this data to compute the axis drive system 54 output. This device is also addressed through lines MADR0 through MADR9 and its output is supplied to the bi-directional data lines MBUS0 through MBUS7.

FIGS. 10A and 10B are schematics of the time-sharing logic associated with this memory. Eight ports enable the honoring of memory requests of up to eight microcomputers on request lines AXMREQ/ through MREQ8/. Only one computer at a time is actually accessing memory. The others are put on hold until the accessing becomes possible. If a request line is honored by an enabling signal on any one of the lines, P1 through P8, an acknowledge signal is returned to the computer on lines AXMACK/ through MACK8. The memory transaction will be executed and a finish signal will be received by the computer on one of lines AXFIN/ through FIN8/ to release the bus for some other computer. A three megacycle clock is generated by oscillator U16 and various clock phases and synchronizing signals are generated in the associated logic.

FIGS. 11A through D are schematics of the controller logic board associated with the axis controller. The system clock is applied to gate 200 and 201 of FIG. 11D, driving the mod 1024 counter of FIG. 11C comprising counter devices 202, 203, and 204. The outputs are taken on line C1 through C10. A mod 3 counter comprising flip flops 205, 206 of FIG. 11C and the surrounding circuitry counts down the overflow bit of the mod 1024 counter, and the overflow of the mod 3 counter is in turn counted down by the mod 6 counter 207. The mod 3 and mod 6 counter output lines are C11 through C15. Shift registers 208 and 209 of FIG. 11A capture the state of the various counters and supply them to the rest of the circuit on lines AXX00 through AXX15.

Figure 11A:
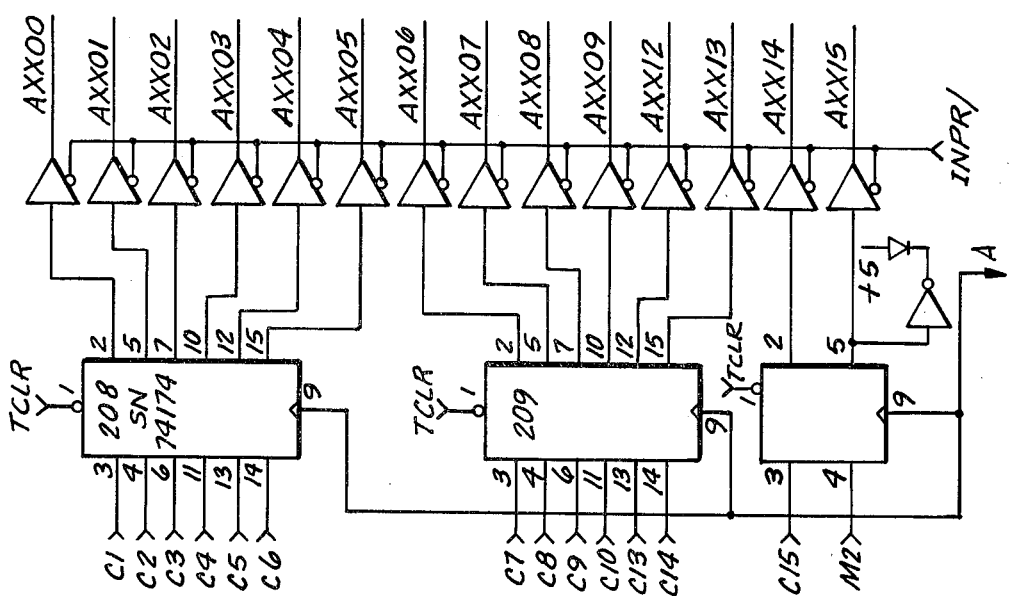
Figure 11B:
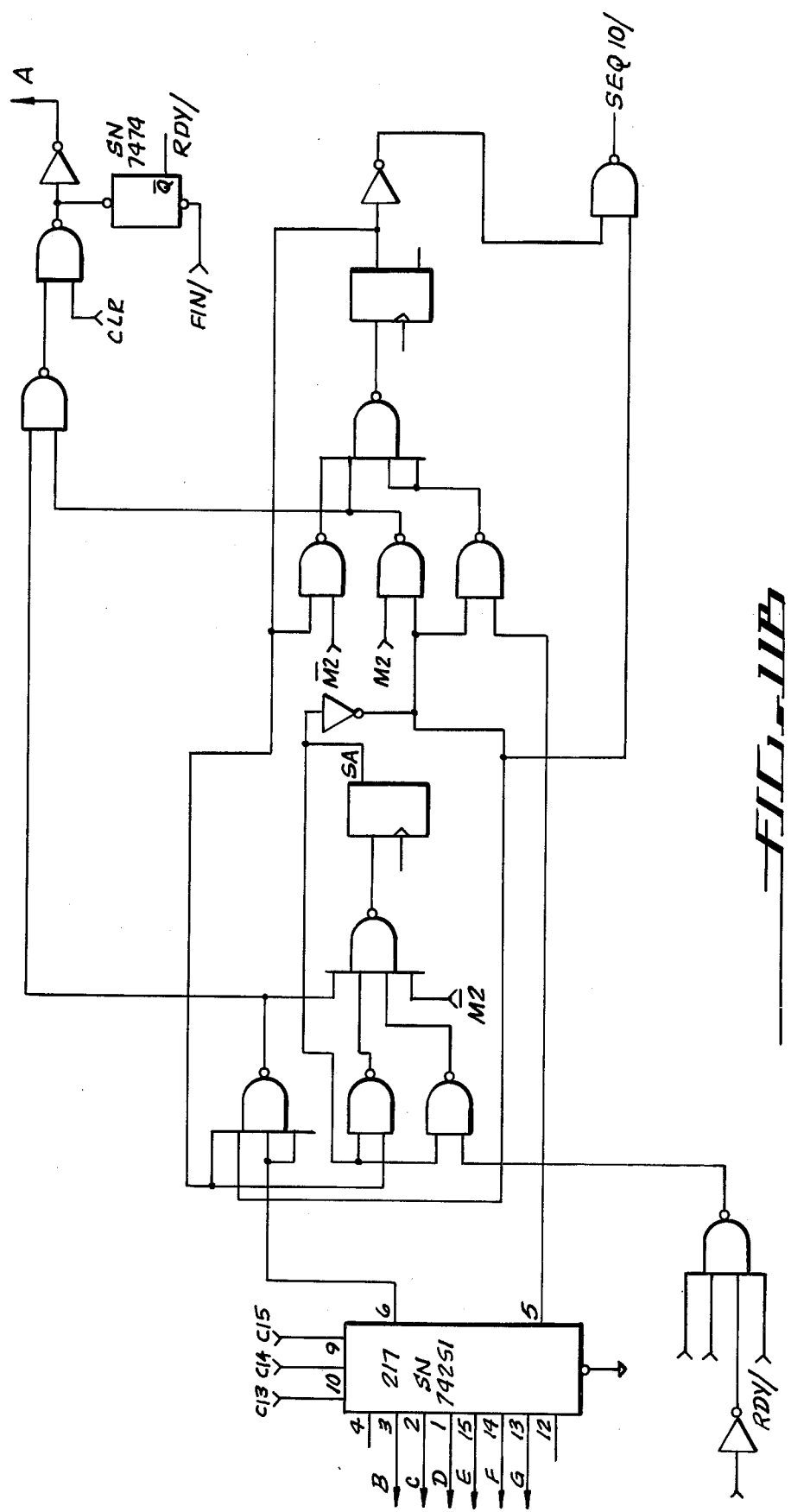
Figure 11C:
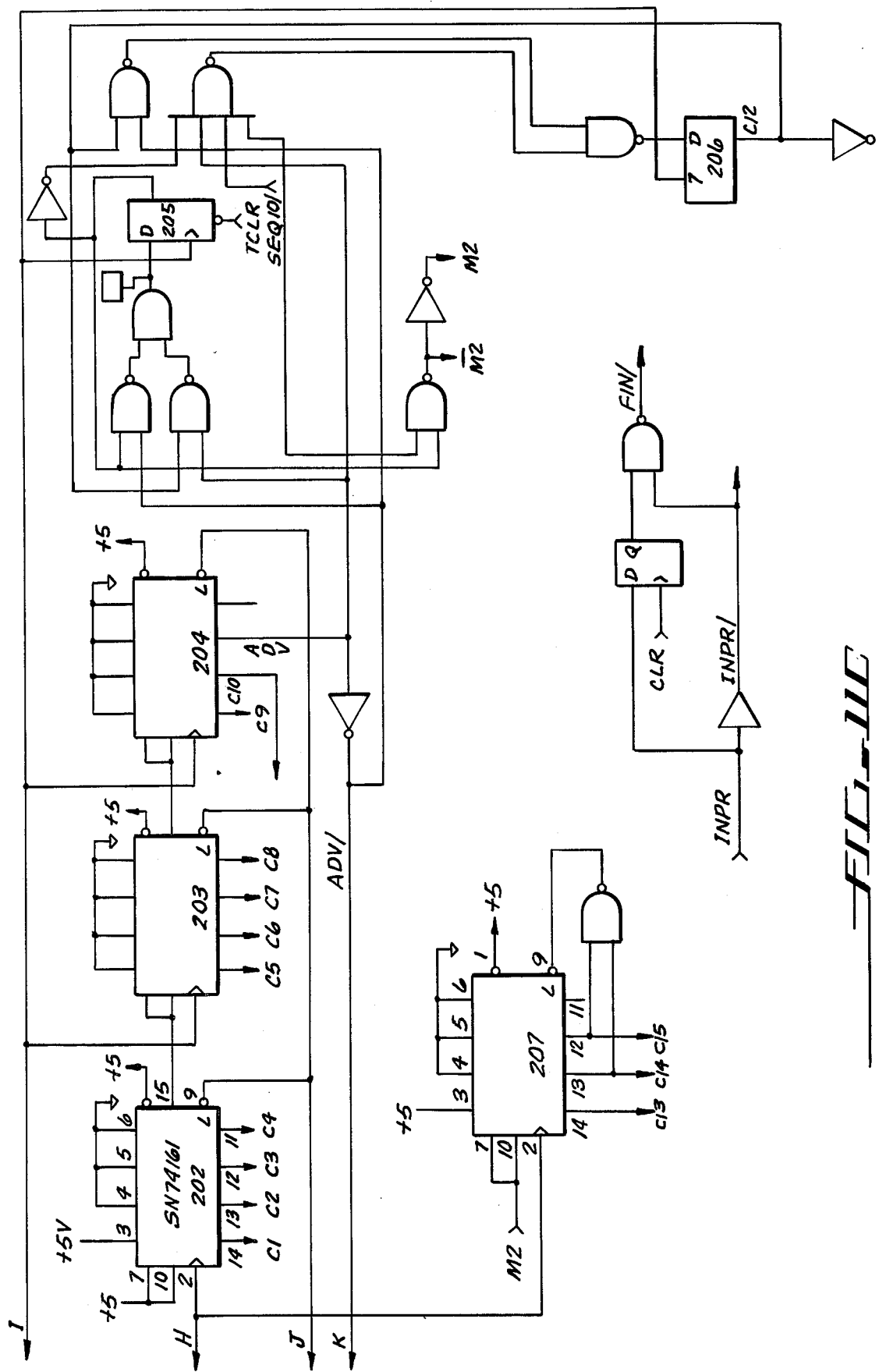
Figure 17A:
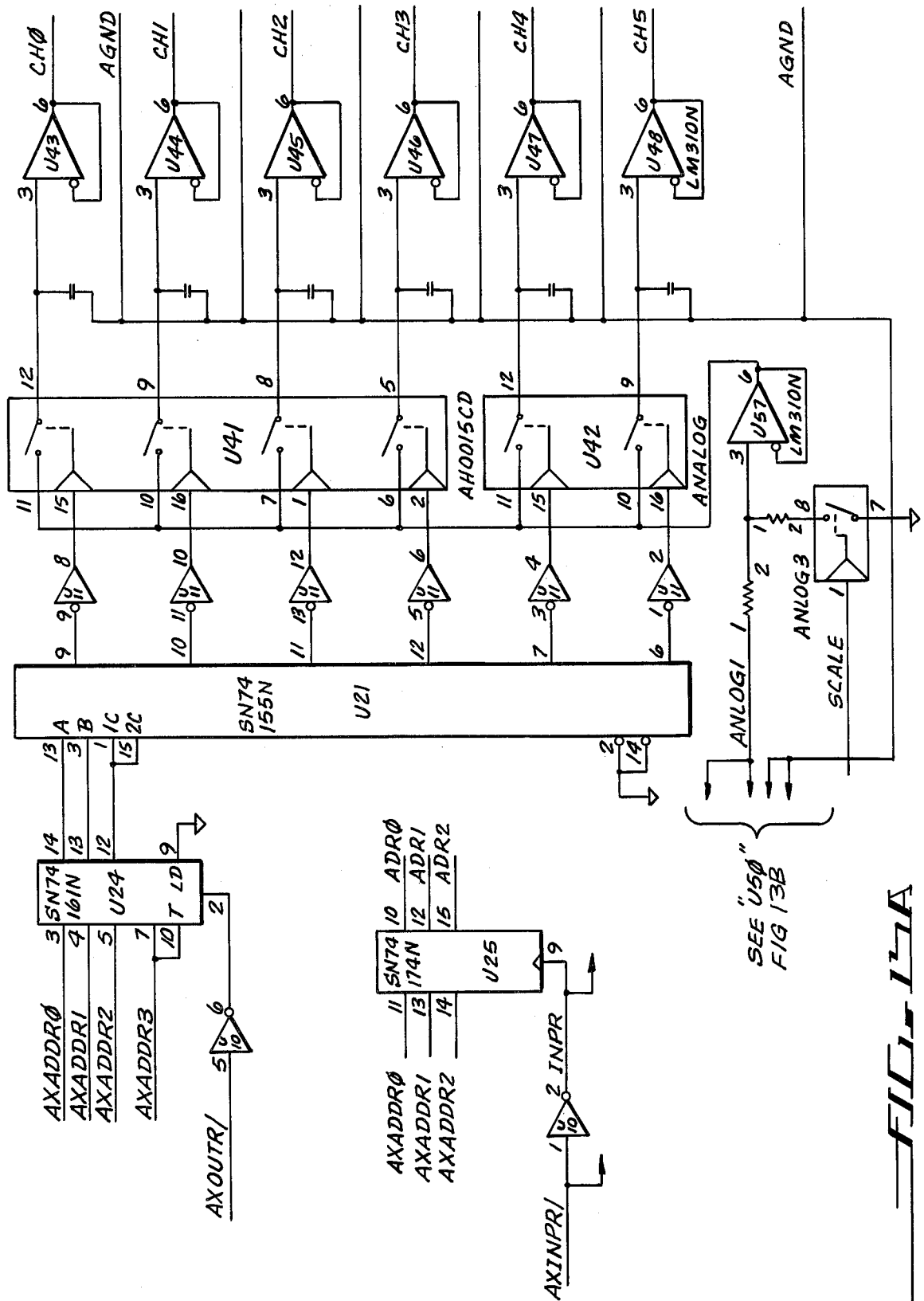

The sin ($\omega t + \phi$) sine waves from the six resolvers are filtered to remove extraneous noise and are applied to the inputs of zero crossing detectors 211 through 216 of FIG. 11D. The resultant square waves are applied simultaneously to multiplexer 217 of FIG. 11B which selects one based on the state of the mod 6 counter inputs C13, C14, and C15 from the mod 6 counter 207 of FIG. 11C. The selected axis zero crossing signal is supplied through sequencing circuits and is ultimately used to capture the state of the mod 1024 counter in devices 208 and 209, FIG. 11A, thus supplying for the selected axis a digital phase signal at lines AXX00 through AXX15 and simultaneously supplying a ready signal at line RDY/ to the remainder of the system.

Figure 12:
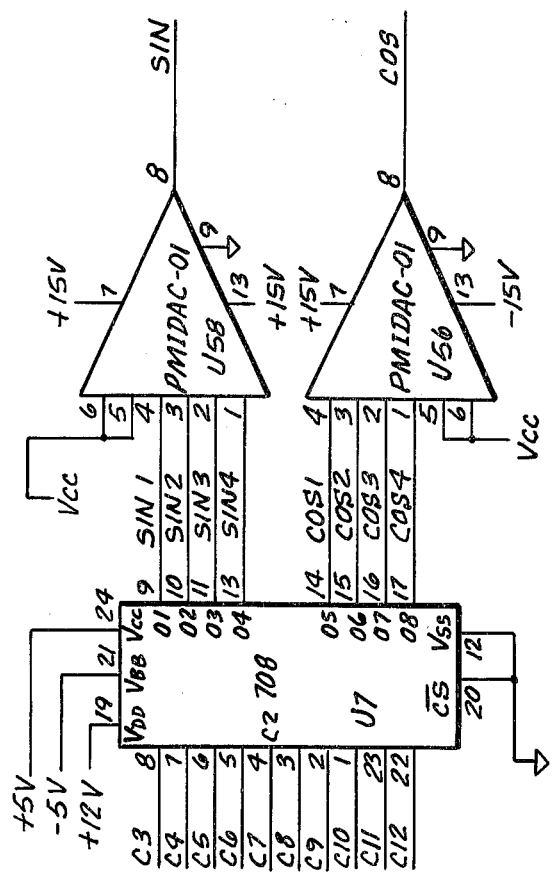
FIG. 12 is a schematic of the circuit which produces the two resolver sine wave inputs.

FIG. 12 is a schematic of the read only memory device 65 and the two digital to analog converters 66 and 67 of FIG. 4. Output lines from the mod 1024 counter and mod 3 counter, C3 through C12, are applied to read only memory device U7 and two sets of four output lines drive the digital to analog converters resulting in a sine and cosine output.

FIGS. 13A and 13B are is a detailed schematic of the sample and hold decoder 84 in FIG. 4. The velocity error computed by axis controller 118 of FIG. 1 is output on the AXX00 through AXX15 lines and is received at the inputs of registers U26 and U27 of FIG. 13B. This information is held at the register output lines, which are the input lines to the digital analog converter U50, long enough for the output line of the digital to analog converter, ANLOG1, to stabilize. This signal, when buffered through operational amplifier U57, becomes the input to FET switch devices U41 and U42 which are under control of a multiplexer U21 which is itself addressed by the computer on AXADRR0 through AXADRR3 address lines. Thus, a selected velocity error is routed through the multiplexer and switch arrangement to charge one capacitor selected from six capacitors C90 through C95. Since the charge time of these capacitors when the corresponding contact of device U41 or U42 is closed is far longer than the leakage rate of these capacitors when the switches of devices U41 and U42 are open, for all practical purposes C90 through C95 are continuously charged to an analog voltage value corresponding to the velocity error associated with each channel. This analog voltage is amplified through operational amplifiers U43 through U48 and sent out on lines CH0 through CH5 to the appropriate axis as the velocity error signal.

Functionally, when the axis controller receives position information from the interpolator it must accomplish several functions. It receives the axis information, computes the actual position, compares it to the commanded position, computes the position error, and outputs a drive signal to the appropriate axis, all of which takes considerable computer time. Therefore, the position is captured about once every sixth resolver sine wave cycle. The information is stored in the latch 75 of FIG. 4 and a discrete signal is supplied to the axis controller to indicate time data is available for that axis. When the axis controller takes notice of this discrete signal it reads a 16 bit word from the hardware through the X bus. One bit indicates that there is new data, three bits indicate the axis number and the lower ten bits give the state of the mod 1024 counter. If no axis is ready, the computer does other housekeeping chores and continually polls the six axes for new data.

The output of the mod 6 counter is the three bits which identify the axis in the word described above. When the axis counter has specified the axis, then the zero crossing detectors 68 through 73 of FIG. 4 begin to look for a zero crossing in the specified axis. As described above, the sine waves are converted to square waves for this detection of the zero crossing time. The hardware waits until the signal from the zero crossing detectors goes from high to low and then captures the mod 1024 counter output as the lower ten bits of the latch data as well as the state of the mod 6 counter which specifies the axis. The state of the 1024 counter is the only position data the computer receives. The mod 3 counter provides several preparatory logic signals for timing purposes. To get instant position, the 1024 counter data must be compared to the previous data to ascertain motion, then accumulated to yield position.

Having solved the input position problem, the axis controller then solves the output velocity problem. This requires the digital to analog converter of FIG. 13B which, with a 12 bit input, is settable to any one of 4,096 possible states ranging from plus to minus 10 volts. This one digital to analog converter output is sent out through any one of six channels in conjunction with the sample and hold circuits of FIG. 13A. Thus, the output is steered to the appropriate axis. In the preferred embodiment each axis is serviced every 6 milliseconds.

In addition to the basic D to A cirlcuit of FIG. 13B, there is a SCALE line which changes the amplification factor to the operational amplifier U57 at the output of the D to A converter by a factor of four which effectively turns the D to A converter into a 14 bit device. Thus, at low speeds where greater servo resolution and accuracy is required, as will be described below, an increased multiplication is built into the circuit.

The information received from the tape reader is a series of part dimensions which are converted into a series of tool and part motions. These incremental motion commands, which are generated by the interpolator, are stored into common data memory along with an appropriate flag bit. These commands are loaded every several milliseconds and define the sum of motion to be produced. The software of the axis controller detects the new data bit and accumulates the new data into the old accumulation resulting in a total or absolute commanded position. The position actually traveled by the tool is also an accumulation of incremental jpositions that are calculated from the information received from the six sets of axis inputs from the machine tool and this gives an accumulation of the position actually moved. These values are subtracted to produce a position error which is then used by each of the six axes as shown in FIGS. 13A and 13B.

Another consideration is the stiffness of the servo loops. The actual stiffness of the servo loop is determined by the machine tool user where stiffness is defined as the amount of velocity called for by the system per unit position error. A typical error correction calls for a tool velocity of one inch per minute for every thousandth of an inch error. These machine constants, that is, the breakpoints and curve slopes, are stored in the 16 bit erasable PROM in the control memory, and result in a servo stiffness curve. A typical curve is shown in FIG. 14. The horizontal dimension of the graph is position lag, typically in thousandths of an inch while the vertical axis of the graph, commanded velocity, is typically measured in inches per minute. In the contouring range, slope A, where the tool is working at its rated accuracy, the slope of the curve is steep, indicating a relatively large correction for relatively small errors. Slope B is usually used for situations where the tool is not in the work but is approaching the work and where a lower slope is provided to minimize the forces applied to the servo system merely to bring the tool into an approximate position. Lower drive requirements minimize vibration and strain to the components. This is sometimes called the positioning range. Finally there is a saturation range which represents a maximum velocity that should never be exceeded. The user defines the shape of this curve and programs the EPROM accordingly. Since the erasable PROM holds 8 bits by 1,024 words, each individual axis may have its own servo gain slope. In prior art systems these constants are the equivalent of a collection of potentiometer adjustments.

Since the position accumulation is updated every 6 milliseconds it is very simple for the computer to calculate the recent average velocity. This is useful since this actual velocity can be compared against the commanded velocity as a check on the proper operation of the system. If the velocities do not agree, obviously the system is not performing correctly. There is an error tolerance which is another constant specified by the user. If this limit is exceeded, a bit is set and displayed to the operator so that he may take appropriate action. The system may be designed so that the equipment will merely light a light, stop the machine, or whatever the user has decided would be appropriate for the particular axis. This velocity check is superior to the typical position error check since a velocity error may be detected before the velocity error results in a significant position error. Position errors are costly in that tools or parts may be damaged since the error detection comes at a time when a tool is already out of position. A velocity error may be detected before a tool becomes involved in a significant position error. Thus, this velocity check saves the cost of broken tools and damaged parts.

Since the accumulated commanded position and the jaccumulated actual position are kept internally in the computer, these may also be displayed continuously on the operator panel if desired. Another option is to zero both the actual position and the commanded position accumulations in the accumulator at a reference point so that, as the machine continues to operate, all dimensions are in reference to that reference point. This option can be a convenience to the operator who may be familiar with the relative dimensions of the part compared to a specific reference point. Similarly, the operator can set the actual and commanded position accumulations to a predetermined number that he is accustomed to working with.

Since the accumulations are kept within the computer memory a "servo null function" is also possible in which the actual and desired positions are set to be equal. This is useful in a case where the machine has been repositioned while the computer was turned off. Under these conditions, upon turn-on there would be a large transient in the system. This may be prevented by the servo null function where the actual and desired positions are set equal.

Another function possible with this apparatus is the zero synchronization function. When the machine is first turned on the cutter must be spatially established in relation to the workpiece very accurately. The operator can set this position by eye to within a fraction of an inch but cannot do it to machine tolerances, of course. However, the machine can be commanded to go to any predetermined position of a resolver cycle. Thus, the operator sets the machine by eye fairly closely and then a zero synchronization command button depression will allow the machine to take the shortest route to the predetermined and highly accurate resolver setting. Thus, the operator is, in effect, adjusting the coarse position of the machine, allowing the machine itself to do the fine positioning. This is a rapid and simple method of precisely aligning the machine prior to the beginning of a machining cycle.

A test mode is also available where the tape is run but no axis motion is allowed. This is handled internally in the computer by automatically accumulating the commanded position into the actual position register as well. Thus, the machine tool sees a zero velocity error and will not move the tool at all while the control panel continues to give accumulated positions in inches as usual. This is useful in the checkout of new tapes where the actual machining of a part may be damaging to the equipment.

While an exemplary embodiment of this invention has been described above and shown in the accompanying drawings, it is to be understood that such embodiment is merely illustrative of, and not restrictive on, the broad invention and that we do not wish to be limited in our invention to the specific construction or arrangement described and shown, for various obvious modifications may occur to persons having ordinary skill in the art.

We claim:

1. A control system for a rotating axis comprising
digital counting means for generating a continuous series of binary counts, each count comprising a plurality of bits,
means for converting said series of binary counts into two series of binary words, the binary value of said words corresponding to two sine wave values ninety degrees out of phase
digital to analog converter means for converting each series of binary words into corresponding voltage levels,
a resolver rotatably coupled to said axis, for receiving said voltage levels from said digital to analog converters for use as reference voltage sine waves, and for outputting a sine wave varying in phase in relation to the rotation of said axis,
a zero crossing detector for converting each resolver output sine wave into a binary pulse having a changing state at each point in time when said sine wave crosses zero,
latch means responsive to the changing state of said detector pulse for storing said digital counting means count at the time when said detector pulse changes state, said count being a digital signal representation of said axis actual position,
input means for generating a digital signal corresponding to a commanded position of said axis,
summing junction means for subtracting said actual position digital signal from said commanded position digital signal to produce a velocity error signal, and
an axis drive means for rotating said axis at a rate proportional to the value of said velocity error signal.

2. The apparatus of claim 1 wherein said input means comprises
a tape reader for generating a digital signal corresponding to a tool start point, end point and interim path, and
an interpolator for translating said tape reader signal into a series of commanded positions in real time.

3. The apparatus of claim 2 wherein said digital counting means comprises:
a clock generator for generating clock pulses,
a counter for counting down said clock pulses, and
an output line for each bit of said counter for outputting the state of the counter in parallel as a plurality of bits.

4. The apparatus of claim 3 wherein said means for converting comprises a read only memory device.

5. The apparatus of claim 4 wherein said digital to analog converter means comprises two digital to analog converter devices for generating said voltage levels.

6. The apparatus of claim 5 wherein
said read only memory device is addressed by said output lines of said counting means and said read only memory device is programmed so that a series of increasing addresses will result in an output of said read only memory device of two sets of output bits whose binary value will approximate said two sine waves ninety degrees out of phase.

7. The apparatus of claim 6 wherein said summing junction means comprises a computer.

8. The apparatus of claim 7 wherein said computer comprises an arithmetic logic unit for subtracting said commanded position digital signal from said actual position digital signal and for multiplying the resultant position error by a constant to produce a velocity error digital signal.

9. The apparatus of claim 8 wherein said axis drive means is responsive to a gain switching command from said computer to multiply said velocity error by one of a plurality of multiplication constants, thereby providing gain switching of said axis drive means.

10. In a multi-axis machine tool numerical control system, the apparatus comprising:
digital counting means for generating a continuous series of binary counts, each count comprising a plurality of bits,
means for converting said series of binary counts into two series of binary words, the binary value of said words corresponding to two sine wave values, ninety degrees out of phase,
digital to analog converter means for converting said binary words into corresponding voltage levels,
a resolver rotatably attached to each axis of said machine tool responsive to said voltage levels for generating an output sine wave having a phase varying in accordance with the angular position of said axis, a zero crossing detector for converting each resolver output sine wave into a binary pulse having a changing state at each point in time when said sine wave crosses zero, latch means for storing and outputting the counts of said counting means at the time when each zero crossing detector binary pulse changes state, thus determining the position of each axis, axis controller means for subtracting each axis position received from said latch means from each commanded position received from a tape reader and multiplying by a constant to produce digital velocity error axis drive signals, and decoding means for converting each digital axis drive signal into analog form and for steering each analog axis drive signal to the axis from which the corresponding resolver output was received.

11. The apparatus of claim 10 wherein said digital counting means comprises:
a clock pulse generator,
a counter for counting down said clock pulses, and
an output line for each bit of said counter for outputting the state of the counter in parallel as a plurality of bits.

12. The apparatus of claim 10 wherein said means for converting comprises a read only memory device.

13. The apparatus of claim 11 wherein said digital to analog converter means comprises two digital to analog converter devices for generating said voltage levels.

14. The apparatus of claim 12 wherein said read only memory device is addressed by said output lines of said counting means and said read only memory device is programmed so that a series of increasing addresses will result in an output of said read only memory device of two sets of output bits whose binary value will approximate said two sine waves ninety degrees out of phase.

15. The apparatus of claim 13 wherein said axis controller comprises a computer.

16. The apparatus of claim 15 wherein said computer comprises an arithmetic logic unit for arithmetically subtracting the digital signal corresponding to the actual position of said axis from the digital signal corresponding to the commanded position of said axis to produce a digital position error signal and
wherein said computer is provided for multiplying said digital position error signal by a constant to convert it to a digital velocity error signal.

17. The apparatus of claim 16 wherein said decoding comprises
(a) a digital to analog converter to convert all digital axis drive signals into analog form,
(b) one sample and hold circuit for each axis, all receiving the digital to analog converter output,
(c) a decoder responsive to addressing data received from said computer to enable each sample and hold circuit to receive its corresponding analog drive signal input, and
(d) one amplifier for each axis for amplifying the output of the corresponding sample and hold circuit and for applying said amplified output as a drive signal to the corresponding machine axis.

18. The apparatus of claim 17 wherein said amplifier is responsive by a gain switching command from said computer to multiply said sample and hold output by one of a plurality of multiplication constants, thereby providing gain switching of said amplifier.

19. The method of controlling the rotational speed of an axis comprising the steps of
using a digital counter to generate a continuously cycling multiple bit output word,
converting said counter output word into two multiple bit words, the binary value of which correspond to two reference sine waves ninety degrees out of phase,
converting said two multiple bit words into two reference sine waves;
applying said reference sine waves as inputs to a resolver which is rotatably attached to said axis,
detecting the zero crossing time of the output sine wave of said resolver and converting it into a timing pulse,
loading a latch with the count of said digital counter at the time of said timing pulse, said count corresponding to the actual position of said axis,
reading from a tape by means of a tape reader a digital signal corresponding to the commanded position of said axis,
subtracting said actual position signal from said commanded position signal in an arithmetic logic unit to produce a digital velocity error signal, and
using said velocity error signal for controlling an axis driver to drive said axis in the direction and velocity as determined by said velocity error signal.

20. The method of controlling the rotational speed of a plurality of axes comprising the steps of:
using a digital counter to generate a continuously cycling multiple bit output word,
converting said counter output word into two multiple bit words, the binary value of which correspond to two reference sine waves ninety degrees out of phase,
applying said reference sine waves as input reference signals to a plurality of resolvers, each rotatably attached to one of said axes,
detecting the zero crossing time of each resolver output sine wave and converting it into a timing pulse,
providing a latch, and loading it with the count of said counter at the time of each timing pulse, said count corresponding to the actual position of each associated axis,
reading from a tape by means of a tape reader a digital signal corresponding to the commanded position signal of each of said plurality of axes,
selecting from said plurality of latch counts the actual position signal corresponding to the same axis as that of said commanded position signal read from said tape,
subtracting said selected actual position signal from said commanded position signal in an arithmetic logic unit to produce a digital velocity error signal, and
using said velocity error for controlling the axis driver of said selected axis to drive said axis in the direction and velocity determined by said velocity error signal.

* * * * *

UNITED STATES PATENT OFFICE
CERTIFICATE OF CORRECTION

PATENT NO. : 4,109,185
DATED : 22 August 1978
INVENTOR(S) : Stanley G. Froyd, et al It is certified that error appears in the above-identified patent and that said Letters Patent are hereby corrected as shown below:

In column 1, line 63, the word [junctions] should be functions; column 11, line 62, the word [jpositions] should be positions; column 12, line 56, the word [jaccumulated] should be accumulated;

column 15, line 49, before the word "comprises" insert the word means.

Signed and Sealed this

Tenth Day of April 1979

[SEAL]

Attest:

RUTH C. MASON
Attesting Officer

DONALD W. BANNER
Commissioner of Patents and Trademarks